US012756462B2

(12) United States Patent
Xue et al.

(10) Patent No.: US 12,756,462 B2
(45) Date of Patent: Oct. 6, 2026

(54) UTILIZING CURVED FOCAL PLANES FOR OPTICAL WIRELESS COMMUNICATION

(71) Applicant: QUALCOMM Incorporated, San Diego, CA (US)

(72) Inventors: Yisheng Xue, San Diego, CA (US); Karoly Becze, Escondido, CA (US); Xiaoxia Zhang, San Diego, CA (US); Junyi Li, Fairless Hills, PA (US); Morteza Soltani, San Diego, CA (US); Sam Liu, San Diego, CA (US); Jing Sun, San Diego, CA (US); Jason Bush, Escondido, CA (US); Timothy Vu, San Diego, CA (US); Sergio Alvarez, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 18/327,779

(22) Filed: Jun. 1, 2023

(65) Prior Publication Data

US 2024/0405867 A1 Dec. 5, 2024

(51) Int. Cl.

*H04B 10/40* (2013.01)
*H04B 10/079* (2013.01)
*H04B 10/11* (2013.01)

(52) U.S. Cl.

CPC ....... *H04B 10/07953* (2013.01); *H04B 10/11* (2013.01); *H04B 10/40* (2013.01)

(58) Field of Classification Search

CPC .. H04B 10/11; H04B 10/1129; H04B 10/1149
See application file for complete search history.

(56) References Cited

U.S. PATENT DOCUMENTS 4,914,284 A * 4/1990 Halldorsson ........... G02B 6/241 356/141.5
5,012,081 A * 4/1991 Jungwirth ............. G01S 3/7867 250/203.6

(Continued)

FOREIGN PATENT DOCUMENTS

WO WO-2022218918 A1 10/2022

OTHER PUBLICATIONS

International Search Report and Written Opinion - PCT/US2024/028186 - ISA/EPO - 2024-08-05 (2303658WO).

*Primary Examiner* — Tanya T Motsinger
(74) *Attorney, Agent, or Firm* — Holland & Hart LLP/ QUALCOMM Incorporated

(57) ABSTRACT

Methods, systems, and devices for wireless communications are described. A user equipment (UE) in an optical wireless communications system may utilize a curved focal plane of a condenser lens to communicate an optical wireless signal. An optical front-end (OFE) of the UE may include one or more optical communication components located at varying distances from the condenser lens on a curved focal plane of the condenser lens. Additionally or alternatively, the UE may adjust a position of one or more optical communication components on the curved focal plane. Additionally or alternatively, the OFE may include an array of condenser lenses and optical communication components each optically coupled with one or more condenser lenses. The UE may perform equal gain combination and/or equal ratio power splitting to communicate an optical wireless signal using the array of condenser lenses and optical communication components.

27 Claims, 19 Drawing Sheets

(56) References Cited

U.S. PATENT DOCUMENTS

| | | | | |
|---|---|---|---|---|
| 6,624,916 | B1 * | 9/2003 | Green | H04B 10/1125 398/169 |
| 2001/0043381 | A1 * | 11/2001 | Green | H04B 10/2587 398/126 |
| 2009/0308852 | A1 * | 12/2009 | Alpay | B23K 26/046 219/121.72 |
| 2015/0156568 | A1 * | 6/2015 | Byers | H04B 10/1149 398/55 |
| 2015/0370011 | A1 * | 12/2015 | Ishihara | G02B 13/18 348/374 |
| 2015/0370012 | A1 * | 12/2015 | Ishihara | G02B 6/06 348/308 |
| 2018/0159244 | A1 * | 6/2018 | Tzuang | H01Q 3/245 |
| 2019/0288773 | A1 * | 9/2019 | La Fata | G02B 7/021 |
| 2019/0353868 | A1 * | 11/2019 | Renshaw | G02B 26/0816 |
| 2022/0107473 | A1 * | 4/2022 | Brinkley | G02B 6/4225 |
| 2022/0247084 | A1 * | 8/2022 | Nie | H04B 7/0413 |
| 2023/0142781 | A1 * | 5/2023 | Soltani | G02F 1/292 706/62 |
| 2024/0137120 | A1 * | 4/2024 | Cornelissen | H04B 10/11 |
| 2024/0405867 | A1 * | 12/2024 | Xue | H04B 10/07953 |
| 2025/0220286 | A1 * | 7/2025 | Bourbon | H04N 23/69 |
| 2025/0244620 | A1 * | 7/2025 | Tice | G02F 1/1339 |

* cited by examiner

UTILIZING CURVED FOCAL PLANES FOR OPTICAL WIRELESS COMMUNICATION

TECHNICAL FIELD

The following relates to wireless communications, including utilizing curved focal planes for optical wireless communication.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communication systems may support optical wireless communications in which wireless communication devices may transmit and receive optical wireless signals (for example, signals at frequencies within the range of $10^{13}$ to $10^{16}$ hertz (Hz), such as signals in the infrared to ultraviolet spectrum). via an optical wireless communication link. For example, using respective optical communication components, a first wireless communication device may transmit an optical wireless signal, and a second wireless communication device may receive the optical wireless signal. The optical communication components may include, for example, a photodetector and/or a light source. In some cases, the first wireless communications device may transmit the optical wireless signal by emitting the optical wireless signal using a light source via a condenser lens. The second wireless communication device may receive the optical wireless signal by condensing the optical wireless signal via a condenser lens to a photodetector.

SUMMARY

The systems, methods, and devices of this disclosure each have several innovative aspects, no single one of which is solely responsible for the desirable attributes disclosed herein.

One innovative aspect of the subject matter described in this disclosure can be implemented an apparatus for optical wireless communication at a user equipment (UE). The apparatus may include a condenser lens and a set of optical communication components positioned on a curved focal plane associated with the condenser lens. The set of optical communication components may include one or more first optical communication components positioned on the curved focal plane a first distance from the condenser lens and one or more second optical communication components positioned on the curved focal plane a second distance different than the first distance from the condenser lens. The apparatus may further include one or more memories storing processor-executable code and one or more processors coupled with the one or more memories. The one or more processors may be individually or collectively configured to, when executing the code, cause the apparatus to establish an optical wireless communication link with a network entity and communicate, with the network entity via the optical wireless communication link, an optical wireless signal using at least one of the set of optical communication components.

Another innovative aspect of the subject matter described in this disclosure can be implemented in method for optical wireless communication at a UE. The method includes communicating, with a network entity via an optical wireless communication link, a first optical wireless signal using an optical communication component of the UE, adjusting the optical communication component from a first position on a curved focal plane associated with a condenser lens via which the first optical wireless signal is communicated to a second position on the curved focal plane in accordance with a measurement of the first optical wireless signal, and communicating, via the optical wireless communication link after adjusting the optical communication component, a second optical wireless signal using the adjusted optical communication component.

Another innovative aspect of the subject matter described in this disclosure can be implemented in an apparatus for optical wireless communication at a UE. The apparatus may include one or more memories storing processor-executable code, and one or more processors coupled with the one or more memories. The one or more processors may be individually or collectively configured to, when executing the code, cause the apparatus to communicate, with a network entity via an optical wireless communication link, a first optical wireless signal using an optical communication component of the UE, adjust the optical communication component from a first position on a curved focal plane associated with a condenser lens via which the first optical wireless signal is communicated to a second position on the curved focal plane in accordance with a measurement of the first optical wireless signal, and communicate, via the optical wireless communication link after adjusting the optical communication component, a second optical wireless signal using the adjusted optical communication component.

Another innovative aspect of the subject matter described in this disclosure can be implemented in an apparatus for optical wireless communication at a UE. The apparatus may include means for communicating, with a network entity via an optical wireless communication link, a first optical wireless signal using an optical communication component of the UE, means for adjusting the optical communication component from a first position on a curved focal plane associated with a condenser lens via which the first optical wireless signal is communicated to a second position on the curved focal plane in accordance with a measurement of the first optical wireless signal, and means for communicating, via the optical wireless communication link after adjusting the optical communication component, a second optical wireless signal using the adjusted optical communication component.

Another innovative aspect of the subject matter described in this disclosure can be implemented in a non-transitory computer-readable medium storing code for wireless communications at a UE. The code may include instructions executable by at least one processor to communicate, with a network entity via an optical wireless communication link, a first optical wireless signal using an optical communication component of the UE, adjust the optical communication component from a first position on a curved focal plane associated with a condenser lens via which the first optical wireless signal is communicated to a second position on the curved focal plane in accordance with a measurement of the first optical wireless signal, and communicate, via the optical wireless communication link after adjusting the optical communication component, a second optical wireless signal using the adjusted optical communication component.

Another innovative aspect of the subject matter described in this disclosure can be implemented an apparatus for optical wireless communication at a UE. The apparatus may include: an optical communication system including a plurality of lenses and a plurality of optical communication components that are each optically coupled with a respective lens of the plurality of lenses and positioned on a respective curved focal plane associated with the respective lens. The apparatus may further include one or more memories storing processor-executable code and one or more processors coupled with the one or more memories. The one or more processors coupled with the one or more memories and individually or collectively configured to, when executing the code, cause the apparatus to establish an optical wireless communication link with a network entity and communicate, with the network entity via the optical wireless communication link, an optical wireless signal using the optical communication system.

Another innovative aspect of the subject matter described in this disclosure can be implemented in method for optical wireless communication at a UE. The method may include communicating, with a network entity via an optical wireless communication link, a first optical wireless signal using an optical communication system including a set of multiple lenses and a set of multiple optical communication components that are each optically coupled with a respective lens of the set of multiple lenses, adjusting the set of multiple optical communication components from a respective first position on a respective curved focal plane associated with the respective lens to a respective second position on the respective curved focal plane in accordance with a measurement of the first optical wireless signal, and communicating, via the optical wireless communication link after adjusting the set of multiple optical communication components, a second optical wireless signal using the adjusted set of multiple optical communication components.

Another innovative aspect of the subject matter described in this disclosure can be implemented in an apparatus for optical wireless communication at a UE. The apparatus may include one or more memories storing processor-executable code, and one or more processors coupled with the one or more memories. The one or more processors may be individually or collectively configured to, when executing the code, cause the apparatus to communicate, with a network entity via an optical wireless communication link, a first optical wireless signal using an optical communication system including a set of multiple lenses and a set of multiple optical communication components that are each optically coupled with a respective lens of the set of multiple lenses, adjust the set of multiple optical communication components from a respective first position on a respective curved focal plane associated with the respective lens to a respective second position on the respective curved focal plane in accordance with a measurement of the first optical wireless signal, and communicate, via the optical wireless communication link after adjusting the set of multiple optical communication components, a second optical wireless signal using the adjusted set of multiple optical communication components.

Another innovative aspect of the subject matter described in this disclosure can be implemented in an apparatus for optical wireless communication at a UE. The apparatus may include means for communicating, with a network entity via an optical wireless communication link, a first optical wireless signal using an optical communication system including a set of multiple lenses and a set of multiple optical communication components that are each optically coupled with a respective lens of the set of multiple lenses, means for adjusting the set of multiple optical communication components from a respective first position on a respective curved focal plane associated with the respective lens to a respective second position on the respective curved focal plane in accordance with a measurement of the first optical wireless signal, and means for communicating, via the optical wireless communication link after adjusting the set of multiple optical communication components, a second optical wireless signal using the adjusted set of multiple optical communication components.

Another innovative aspect of the subject matter described in this disclosure can be implemented in a non-transitory computer-readable medium storing code for wireless communications at a UE. The code may include instructions executable by a processor to communicate, with a network entity via an optical wireless communication link, a first optical wireless signal using an optical communication system including a set of multiple lenses and a set of multiple optical communication components that are each optically coupled with a respective lens of the set of multiple lenses, adjust the set of multiple optical communication components from a respective first position on a respective curved focal plane associated with the respective lens to a respective second position on the respective curved focal plane in accordance with a measurement of the first optical wireless signal, and communicate, via the optical wireless communication link after adjusting the set of multiple optical communication components, a second optical wireless signal using the adjusted set of multiple optical communication components.

DETAILED DESCRIPTION

Figure 1:
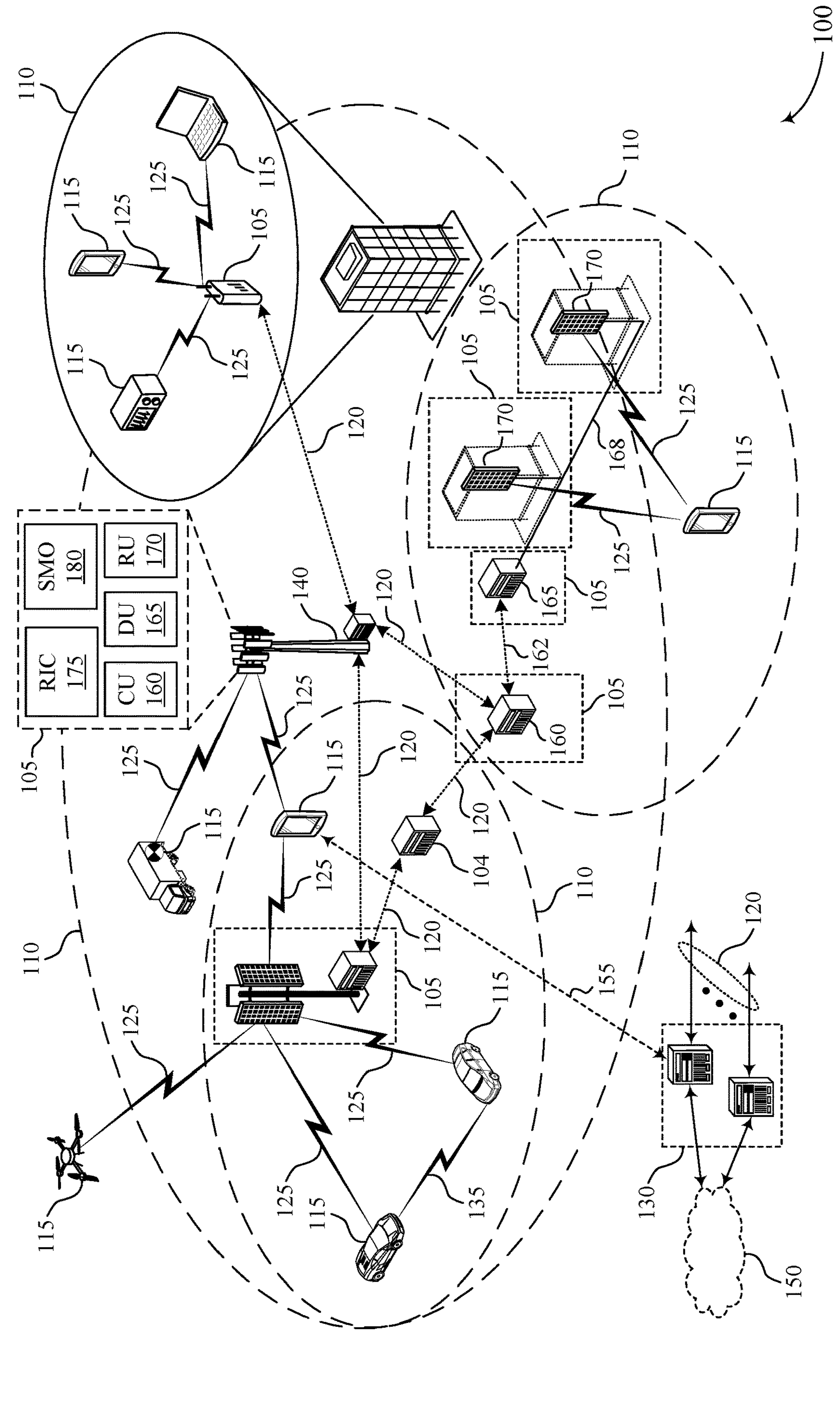
FIG. 1 shows an example of a wireless communications system that supports utilizing curved focal planes for optical wireless communication in accordance with one or more aspects of the present disclosure.

Some wireless communications systems may support optical wireless communications. For instance, a first device, such as a user equipment (UE), may communicate with a second device, such as a network entity, via an optical wireless communication link. For example, the first device may transmit an optical wireless signal to the second device via a beam of light using a light source, and the second device may receive and measure the optical wireless signal using a photodetector, such as via a condenser lenses that focuses the optical signal onto the photodetector. A combination of one or more condenser lenses and one or more optical communication components (such as light sources and/or photodetectors) used to communicate an optical wireless signal may be referred to as an optical front end (OFE) of a device that supports optical wireless communications. In some examples, using a photodetector with a relatively smaller surface area may increase a quality (for example, a reliability, a received power, a signal-to-noise ratio (SNR), a signal-to-noise-plus-interference ratio SINR)) of an optical wireless signal as compared to a photodetector with a relatively larger surface area, for example, due to being associated with a higher gain of the measured signal relative to the photodetector with the relatively larger surface area. However, if the optical wireless signal enters a condenser lens at an angle α rather than at a boresight direction of the condenser lens, the condenser lens may focus the optical wireless signal to a location other than the location of the photodetector. Such focusing of the optical wireless signal may decrease the quality of the received optical wireless signal due to a reduced gain of the received optical wireless signal or result in failure to measure the optical wireless signal.

Various aspects generally relate to optical wireless communications, and more specifically, to utilizing curved focal planes and/or optical communication systems for optical wireless communications. For example, a condenser lens may be associated with a curved focal plane. The curved focal plane may be a curved plane (for example, a curved surface, a mathematical plane) representing the various locations to which the condenser lens may focus an incoming optical wireless signal, such as depending on an incident angle (for example, the angle at which the optical wireless signal enters the condenser lens relative to the boresight direction) of the incoming optical wireless signal. Additionally, the angle at which an outgoing optical wireless signal exits the condenser lens (for example, as a collimated beam of light) may depend on a location of a light source of the optical wireless signal on the curved focal plane. In some examples, an OFE of a UE may include multiple optical communication components (such as light sources and/or photodetectors) placed on (for example, along) a curved focal plane of a condenser lens. Additionally, or alternatively, the OFE of the UE may include translation and/or rotation stages that may adjust a position of one or more optical communication components of the OFE on the curved focal plane of the condenser lens, such as by adjusting the position of the optical communication components or the condenser lens. Such position adjustment may be referred to as intra-OFE steering. Additionally, or alternatively, the OFE of the UE may include an optical communication system (e.g., one or more optical subarray systems). The optical communication system may include an array of multiple condenser lenses that are each optically coupled with one or more respective optical communication components. The components and lenses of the optical communication system may be arranged such that the UE may perform equal-ratio power splitting and/or equal gain combination to optical wireless signals transmitted or received via the optical communication components, respectively. The optical communication system may additionally or alternatively include (for example, be coupled with) translation and/or rotation stages to support intra-OFE steering.

Particular aspects of the subject matter described in this disclosure may be implemented to realize one or more of the following potential advantages. The techniques employed by the described communication devices may provide benefits and enhancements to the operation of the communication devices, including supporting optical beam steering, increasing coverage of an optical wireless communications system, increasing a quality of optical wireless communications, and facilitating miniaturization of UEs that support optical wireless communications. For example, placing multiple optical communication components on a curved focal plane of a lens and/or intra-OFE steering may increase the gain of an optical wireless signal received at non-boresight incident angles to support adaptive beam steering and increase the coverage for which optical wireless signals may be communicated. Intra-OFE steering may also support miniaturization of UEs, for example, by supporting the use of smaller photodetectors. Intra-OFE steering may further support the miniaturization of UEs and optical beam steering, for example, as a lighter load and smaller travel distance associated with translating and/or rotating a photodetector or a lens may facilitate faster steering speed and smaller translation and/or rotation stages as compared to translating and/or rotating an entirety of the OFE to perform optical beam steering. In some implementations, the gain of a communicated optical wireless signal may increase as a result of the UE performing equal gain combination on the signal received via the array of lenses and photodetectors of an optical communication system. Such equal gain combination may support a reduced quantity of radio frequency chains used to support the optical communication system while supporting a wider FOV of the UE.

Performing equal power ratio splitting in association with transmitting an optical wireless signal via an optical communication system may further support the reduced quantity of radio frequency chains (for example, as compared to having a respective radio frequency chain for each light source of the optical communication system).

Aspects of the disclosure are initially described in the context of wireless communications systems. Aspects of the disclosure are further illustrated and described with reference to OFEs, optical communication systems, and process flows. Aspects of the disclosure are further illustrated by and described with reference to apparatus diagrams, system diagrams, and flowcharts that relate to utilizing curved focal planes for optical wireless communication.

FIG. 1 shows an example of a wireless communications system 100 that supports utilizing curved focal planes for optical wireless communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU

170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support utilizing curved focal planes for optical wireless communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, a UE 115 may communicate with a network entity 105 via an optical wireless communication link. For example, the network entity 105 may communicate an optical wireless signal with the UE 115 via a beam of light, which may be received and measured using optical components of the UE 115 or network entity 105. Optical components of the UE 115 or network entity 105 may be used to transmit the optical wireless signal. Optical components may include, for example, one or more condenser lenses that may focus the optical wireless signal onto one or more photodetectors. Additionally or alternatively, the optical components may include one or more light sources and one or more condenser lenses (such as same or different condenser lenses) that may collimate optical wireless signals emitted (for example, output) by the one or more lights sources. A combination of optical components (e.g., a combination of one or more condenser lenses, one or more photodetectors, one or more light sources) may be referred to as an OFE of the UE 115 or network entity 105.

In some cases, if an optical wireless signal enters a condenser lens at an angle α different than at a boresight direction of the condenser lens (such as a nonzero angle relative to the boresight direction), the condenser lens may focus the optical wireless signal to a location other than the location of the photodetector. For example, the condenser lens may focus the optical wireless signal to a different location on a curved focal plane of the condenser lens than a position of the photodetector on the curved focal plane. Such focusing of the optical wireless signal may reduce a quality of optical wireless communications, for example, due to reduced gain of the measured optical wireless signal or failure to measure the optical wireless signal.

In some cases, the UE 115 may perform beam steering via movement of the entire OFE, such as using a gimbal, to reduce the angle α such that the optical wireless signal is received closer to the boresight direction. However, such techniques may involve a large apparatus, powerful motors, or both to facilitate the movement, and a speed of the beam steering may be limited due to loads on the motors and large traveling distances.

Techniques described herein may allow for a UE 115 to utilize the curved focal plane of the condenser lens such that the UE 115 may increase the gain of a received optical wireless signal and support faster beam steering. For example, an OFE of the UE 115 may include multiple photodetectors located at varying distances from the condenser lens on a curved focal plane of the condenser lens such that a beam entering the lens at an angle α may be focused on or near to at least one of the multiple photodetectors. Additionally, or alternatively, the UE 115 may adjust, using translation and/or rotation stages, a first position of one or more photodetectors on the curved focal plane of the condenser lens. For example, the UE 115 may measure an optical wireless signal from the network entity 105 and may translate and/or rotate the one or more photodetectors based on the measurement. The UE 115 may adjust the first position of the one or more photodetectors to a second position on the curved focal plane which may result in a higher gain and a higher quality of communication than the first position, as well as a larger FOV. For example, the second position may be closer to a location on the curved focal plane to which the condenser lens focuses a optical wireless signal entering the condenser lens at the angle α. Further, the intra-OFE movement of a photodetector (for example, or a condenser lens to adjust the position of the photodetector relative to the condenser lens) may use smaller, less powerful motors and be associated with a lighter load and smaller distances for movement than use of a gimbal to move the entire OFE.

In some examples, the UE 115 may include an optical communication system including multiple condenser lenses and multiple optical communication components (such as photodetectors and/or light sources) each corresponding to a respective condenser lenses. The UE 115 may measure an optical wireless signal using each of the multiple photodetectors and may perform equal gain combination to combine the measurements from each of the multiple photodetectors. Thus, the UE 115 may measure a relatively higher total signal gain than a single condenser lens and photodetector system, which may result in an increased quality of communications and a larger FOV. In some examples, the UE 115 may move the multiple photodetectors using translation and/or rotation stages on respective curved focal planes of corresponding condenser lenses. In some examples, the UE 115 may move the multiple photodetectors with a shared translation stage, which may reduce an overall mechanical traveling distance in comparison to moving each photodetector individually.

The UE 115 may similarly adjust positions of transmitting optical communication components, such as light sources, or have transmitting optical communication components placed on curved focal planes, for example, to support beam steering in association with uplink transmissions. For example, the OFE of the UE 115 may include one or more light sources positioned on curved focal planes of respective condenser lenses. The UE 115 may translate and/or rotate light sources on the curved focal planes of the respective condenser lenses using translation and/or rotation stages.

Figure 2:
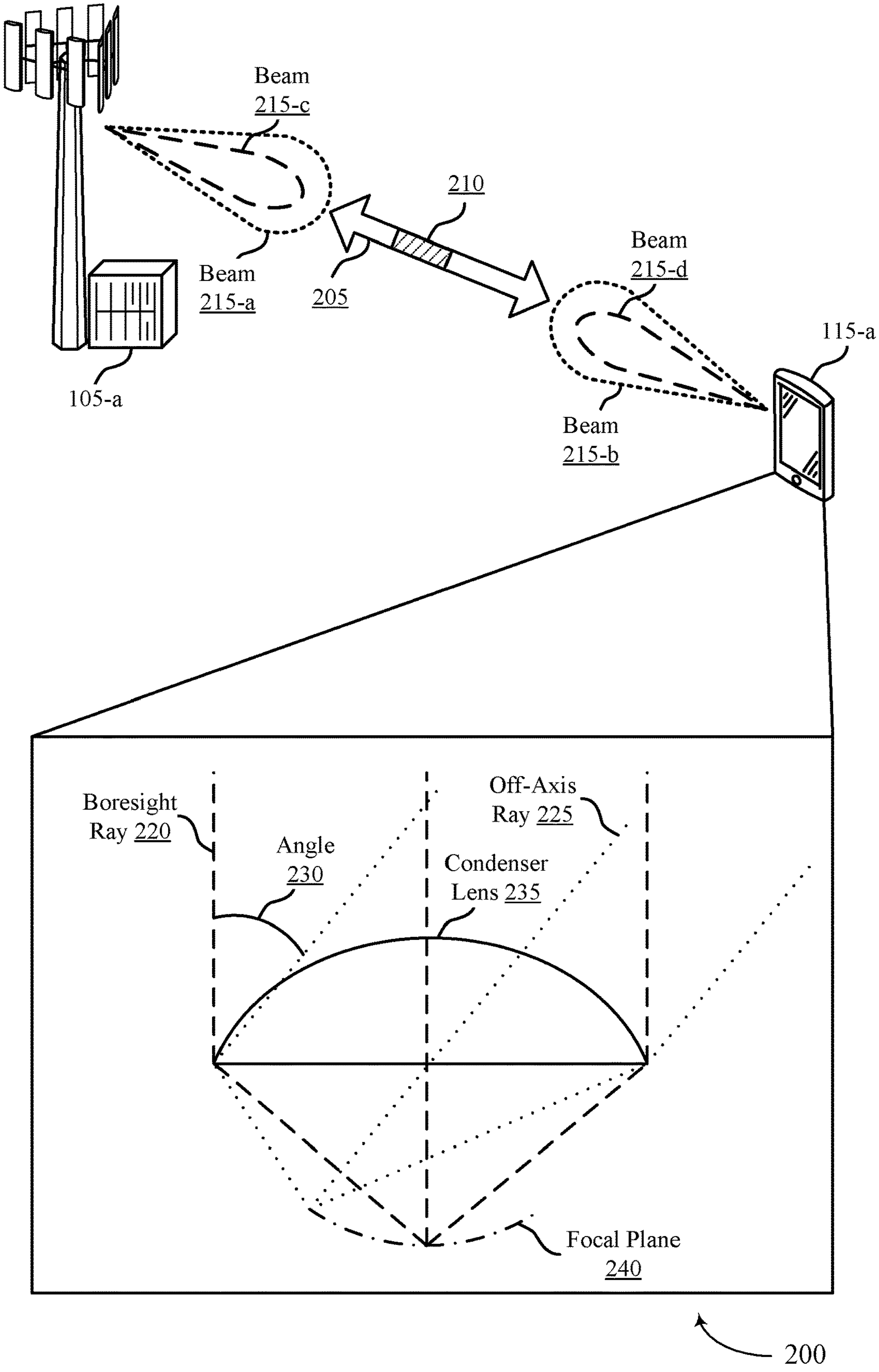
FIG. 2 shows an example of a wireless communications system that supports utilizing curved focal planes for optical wireless communication in accordance with one or more aspects of the present disclosure.

FIG. 2 shows an example of a wireless communications system 200 that supports utilizing curved focal planes for optical wireless communication in accordance with one or more aspects of the present disclosure. In some examples, aspects of the wireless communications system 200 may implement or be implemented by aspects of the wireless communications system 100. For example, the wireless communications system 200 may include a UE 115-*a* and a network entity 105-*a*, which may be examples of the corresponding devices as described with reference to FIG. 1.

In some wireless communication systems, a UE 115-*a* and a network entity 105-*a* may communicate information via an optical RF band. For example, the UE 115-*a* and the network entity 105-*a* may communicate information in a frequency band of (approximately) $10^{13}$ to $10^{16}$ hertz (Hz), such as in the infrared to ultraviolet spectrum. Communications in this frequency band may be referred to as optical communications.

In some examples, the UE 115-*a* and the network entity 105-*a* may support optical wireless communications. For example, the UE 115-*a* and the network entity 105-*a* may transmit optical wireless signals 210, such as beams of light, via an optical wireless communication link 205. The optical wireless communication link 205 may be an example of a communication link 125 via which optical wireless signals 210 may be communicated. In some examples, the network entity 105-*a* and the UE 115-*a* may communicate using optical beams 215 of varying widths. For example, the network entity 105-*a* and the UE 115-*a* may communicate using relatively wider beams, such as a beam 215-*a* and a beam 215-*b*, respectively. In some cases, the network entity 105-*a* and the UE 115-*a* may communicate using relatively narrower optical beams 215, such as a beam 215-*c* and a beam 215-*d*, respectively.

In some optical wireless communication systems, the network entity 105-*a* may transmit an optical wireless signal 210 to the UE 115-*a* by amplifying the optical wireless signal 210 using a power amplifier, emitting the optical wireless signal 210 using a light source, such as a laser light source, and forming a beam 215 using a lens, such as a condenser lens 235. The UE 115-*a* may receive the optical wireless signal 210 at an OFE of the UE 115-*a* by condensing the beam 215 onto a photodetector using a condenser lens 235. The photodetector may include an array of silicon photomultipliers (SiPM) which may increase a gain of the received optical wireless signal 210. In some examples, the UE 115-*a* may similarly transmit the optical wireless signal 210 and the network entity 105-*a* may similarly receive the optical wireless signal 210.

In some examples, the condenser lens 235 may be an aspheric lens. The condenser lens 235 may include one or more convex lenses oriented together such that a boresight ray 220 entering a curved surface of the condenser lens 235 may exit a flat surface of the condenser lens and focus to a first point on a measured or calculated curved focal plane 240 of the condenser lens 235. An off-axis ray 225 entering the curved surface of the condenser lens 235 at an angle 230 (for example, a non-zero angle α relative to a boresight direction of the condenser lens) may exit the flat surface of the condenser lens 235 and condense to a second point on the curved focal plane 240. In some examples, the second point may be closer in proximity to the condenser lens 235 than the first point. That is, a first distance between the flat surface of the condenser lens 235 and the first point may be greater than a second distance between the flat surface of the condenser lens 235 and the second point. In some examples, the curvature of the focal plane 240 may be corrected such that the second point and the first point are equidistant from the condenser lens 235.

The gain of the received optical wireless signal 210 may be larger for a relatively smaller sized photodetector than for a relatively larger sized photodetector. For example, the gain of the optical wireless signal 210 detected by a photodetector may be described by $$10*\log_{10}\frac{A_1}{A_2},$$

in which $A_1$ is the area of the condenser lens 235 and $A_2$ is the area of the photodetector. However, the relatively smaller sized photodetector may cover less area on the curved focal plane 240 than a relatively larger sized photodetector. As such, the smaller sized photodetector may have a limited FOV and may receive off-axis rays 225 associated with nonzero angles 230 with a limited gain or be unable to detect off-axis rays 225 (such as for relatively large angles 230). Additionally, larger sized photodetectors, however, may have insufficient gain for receiving one or both of boresight rays 220 and off-axis rays 225, in addition to occupying more space of an OFE, and may thus be inadequate substitutes for the smaller sized photodetectors to receive an optical wireless signal 210.

To improve communication reliability with smaller sized photodetectors, some beam steering techniques may allow for the UE 115-*a* (for example, or network entity 105-*a*) to adjust a position of the OFE of the UE 115-*a* to reduce the angle 230 of off-axis rays 225. For example, the UE 115-*a* may rotate the OFE, including the condenser lens 235 and the photodetector, using a gimbal. Such rotation may decrease the angle 230 such that the off-axis rays 225 may focus to a point at or close to the photodetector, and may increase the FOV of the UE 115-*a* and the received gain of the optical wireless signals 210. However, gimbal-based beam steering techniques may include a large apparatus with powerful motors. Additionally, such techniques may involve large traveling distances, which may result in increased latency in communications, such as to enable the gimbal to correctly position the OFE of the UE 115-*a* (for example, or the network entity 105-*a*).

The UE 115-*a* and/or the network entity 105-*a* may support various techniques to support communicating off-axis rays 225 using relatively smaller photodetectors. In some implementations, the OFE of the UE 115-*a* or network entity 105-*a* may include multiple photodetectors placed in different locations along the curved focal plane 240. For example, the OFE may include a first photodetector positioned at the first point on the curved focal plane 240 to detect boresight rays 220. The OFE may include one or more additional photodetectors placed on other points on the curved focal plane 240, such as the second point, to detect off-axis rays 225. Such implementations are described in further detail with reference to FIG. 3.

In some implementations, to reduce apparatus size, power, and latency (for example, to support miniaturization of the UE 115-*a*), the UE 115-*a* (for example, or the network entity 105-*a*) may perform intra-OFE beam steering by adjusting a position of one or more photodetectors on the curved focal plane 240. That is, the UE 115-*a* or the network entity 105-*a* may use translation and/or rotation stages to move the one or more photodetectors on the curved focal plane 240. Additionally, or alternatively, the UE 115-*a* or the network entity 105-*a* may adjust a position of the condenser lens 235 relative to the one or more photodetectors such that the one or more photodetectors lie in a different position on the curved focal plane 240. The one or more photodetectors may receive both boresight rays 220 and off-axis rays 225 from a wider FOV and a wider range of angles 230 at a higher received gain than a photodetector in a fixed location on the curved focal plane 240. The UE 115-*a* or the network entity 105-*a* may perform such intra-OFE beam steering techniques with a relatively smaller and less powerful apparatus than gimbal-based beam steering. Intra-OFE beam steering techniques may additionally incur less latency than gimbal-based beam steering due to a lighter apparatus and smaller travel distances. Such intra-OFE beam steering techniques are described in more detail with reference to FIGS. 4A, 4B, and 5.

In some implementations, the OFE of the UE 115-*a* or network entity 105-*a* may include an optical subarrays of condenser lenses 235 and photodetectors optically coupled with respective condenser lens 235. The subarrays of condenser lenses 235 and photodetectors may be referred to as an optical communication system. The optical communication system may include multiple condenser lenses 235 and photodetectors associated with a shared FOV. The UE 115-*a* may receive the optical wireless signal 210 via each condenser lens 235 and each photodetector and may perform back-end electrical processing to combine outputs from the photodetectors, resulting in an increased total gain of the received optical wireless signal 210. For example, the UE 115-*a* may perform equal gain combination of the outputs of the photodetectors. A larger optical communication system with a greater quantity of condenser lenses 235 and photodetectors may receive the optical wireless signal 210 with a relatively larger total gain than a smaller optical subarray or a single condenser lens 235 and photodetector.

In some implementations, the optical communication system may include condenser lenses 235 with a smaller area $A_1$ and/or photodetectors with a smaller area $A_2$. For example, the OFE of the UE 115-*a* or network entity 105-*a* may include aspherical condenser lenses 235 which are smaller than aspherical condenser lenses of a single condenser lens 235 and photodetector system. Smaller condenser lenses 235 may have smaller curved focal planes 240 than larger condenser lenses 235, and off-axis rays 225 entering the smaller condenser lenses 235 may be more likely to focus to a point at or near the photodetectors than off-axis rays entering the larger condenser lenses 235. The photodetectors may be less likely to detect an optical wireless signal 210 with a gain of 0 (near zero), and the UE 115-*a* may perform equal gain analog combination with relatively more homogeneous outputs than an optical communication system with a larger areas $A_1$.

In some implementations, the UE 115-*a* or network entity 105-*a* may perform intra-OFE beam steering in an optical communication system. That is, the UE 115-*a* may adjust positions of the multiple photodetectors on curved focal planes 240 of the associated condenser lenses 235. In such examples, the UE 115-*a* may perform intra-OFE beam steering with relatively shorter travel distances for smaller condenser lenses than for larger condenser lenses. Optical communication systems are described in greater detail with reference to FIGS. 6A, 6B, 7A, and 7B.

Similar techniques may apply to transmitting optical components such as light sources, of an OFE of a UE 115-*a* or a network entity 105-*a*. For example, the OFE of the UE 115-*a* or network entity 105-*a* may include light sources positioned on curved focal planes 240 of respective condenser lenses 235. The UE 115-*a* or the network entity 105-*a* may translate and/or rotate the light sources on the curved focal planes 240 of the respective condenser lenses 235 using translation and/or rotation stages.

Figure 3:
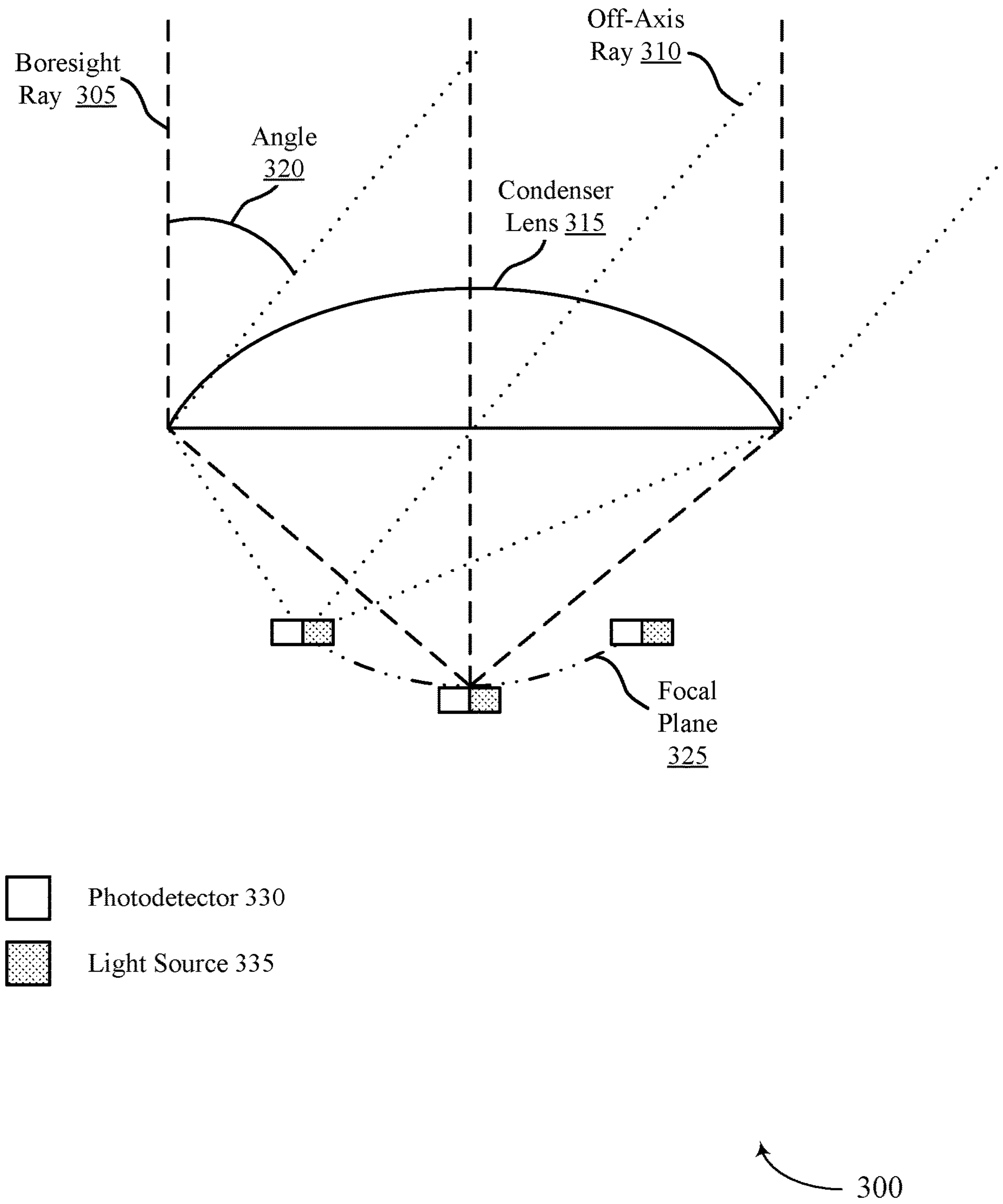
FIG. 3 shows an example of an optical front-end (OFE) that supports utilizing curved focal planes for optical wireless communication in accordance with one or more aspects of the present disclosure.

FIG. 3 shows an example of an OFE 300 that supports utilizing curved focal planes for optical wireless communication in accordance with one or more aspects of the present disclosure. In some examples, aspects of the OFE 300 may implement or be implemented by aspects of the wireless communications system 100 and/or the wireless communications system 200. For example, the OFE 300 may be included in or implemented by a UE 115 and/or a network entity 105, which may be examples of the corresponding devices as described with reference to FIGS. 1 and 2.

As described with reference to FIG. 2, in some examples, a UE 115 and a network entity 105 may communicate optical wireless signals, such as via optical rays (for example, beams of light). For example, the UE 115 or the network entity 105 may receive or transmit the optical wireless signals via a condenser lens 315 and one or more optical communications components, such as photodetectors 330 or light sources 335. Some optical rays, such as boresight rays 305, may enter the condenser lens 315 and focus at a first point along a calculated or measured curved focal plane 325 of the condenser lens 315. Some other rays, such as off-axis rays 310, may enter the condenser lens 315 at an angle 320 from the boresight direction, and may focus at a second point along the curved focal plane 325.

To support receiving both boresight rays 305 and off-axis rays 310, the OFE 300 may include multiple photodetectors 330 placed along the curved focal plane 325. For example, the multiple photodetectors 330 may be placed such that a first photodetector 330 may receive the boresight rays 305 at the first point and one or more additional photodetectors 330 may receive the off-axis rays 310 at one or more additional points, such as the second point. As an illustrative example, the OFE 300 may include multiple layers of photodetectors 330 positioned at varying distances from the condenser lens 315, and each layer of photodetectors 330 may receive boresight rays 305 or off-axis rays 310. A quantity of photodetectors 330 in the OFE 300 and/or a positioning of the photodetectors 330 on the curved focal plane 325 may be in accordance with a supported downlink FOV coverage of the UE 115 or a supported uplink FOV coverage of the network entity 105.

Additionally, or alternatively, the OFE 300 may include other optical communication components, such as light sources 335, located on the curved focal plane 325 of the condenser lens 315. For example, the multiple light sources 335 may be placed such that a first light source 335 may transmit boresight rays 305 from the first point and one or more additional light sources 335 may transmit off-axis rays 310 from one or more additional points, such as the second point. As an illustrative example, the OFE 300 may include multiple layers of light sources 335 positioned at varying distances from the condenser lens 315, and each layer of light sources 335 may transmit boresight rays 305 or off-axis rays 310. A quantity of light sources 335 in the OFE 300 and/or a positioning of the light sources 335 on the curved focal plane 325 may be in accordance with a supported uplink FOV coverage of the UE 115 or a support downlink FOV coverage of the network entity 105. The quantity of light sources 335 may be the same or different as the quantity of photodetectors 330. In some examples, the light sources 335 may be co-located with the photodetectors 330 (such as positioned adjacent to a respective photodetector). In some examples, the light sources 335 may be in locations on the curved focal plane 325 different from locations of the photodetectors 330.

Figure 4A:
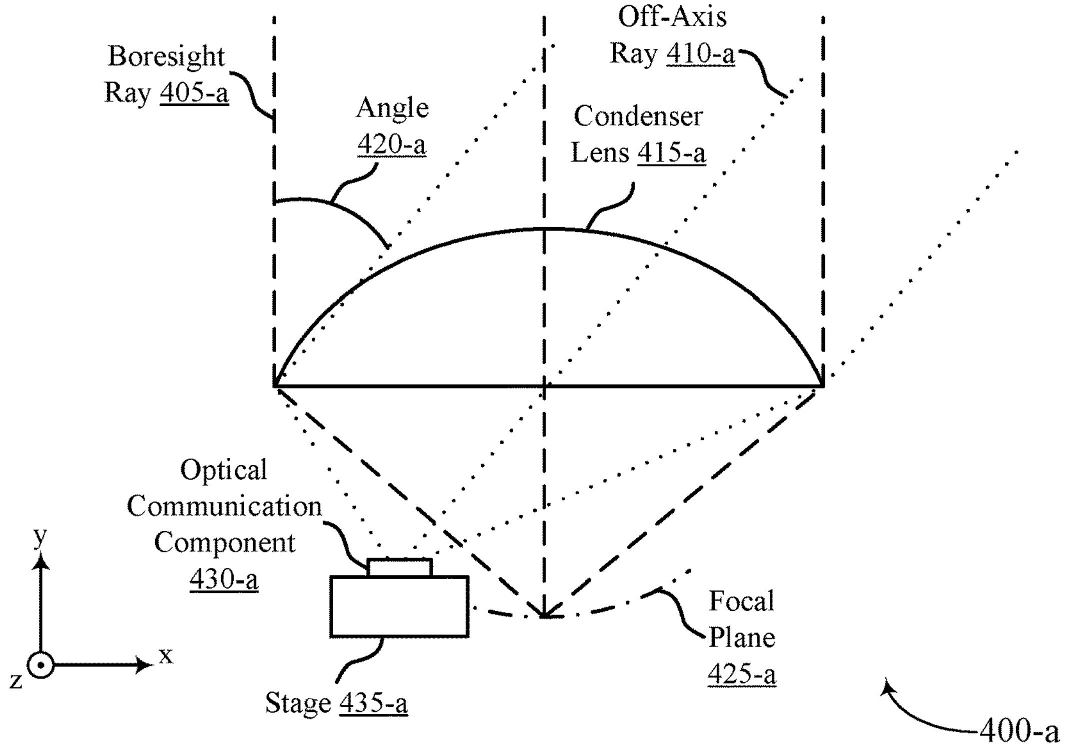
FIGS. 4A and 4B show examples of OFEs that support utilizing curved focal planes for optical wireless communication in accordance with one or more aspects of the present disclosure.
Figure 4B:
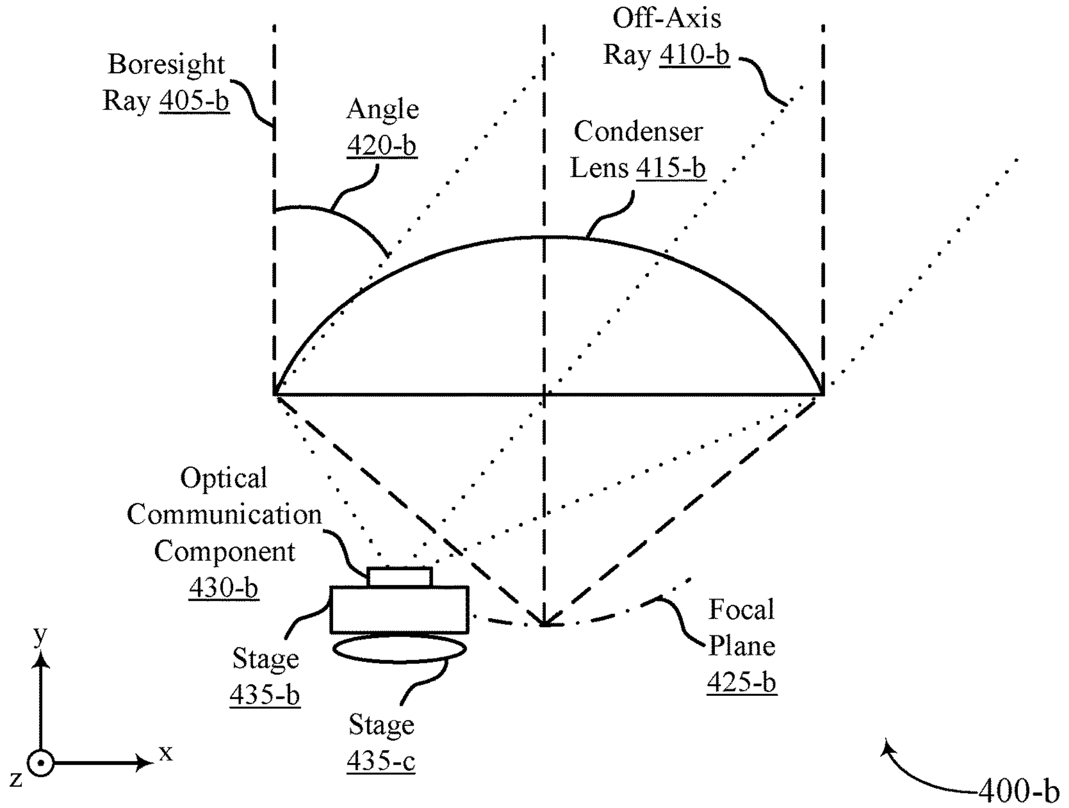

FIGS. 4A and 4B show examples of an OFE 400-*a* and an OFE 400-*b* that support utilizing curved focal planes for optical wireless communication in accordance with one or more aspects of the present disclosure. In some examples, aspects of the OFE 400-*a* and the OFE 400-*b* may implement or be implemented by aspects of the wireless communications system 100, the wireless communications system 200, and/or the OFE 300. For example, the OFE 400-*a* and the OFE 400-*b* may be include in or implemented by a UE 115 and/or a network entity 105, which may be examples of the corresponding devices as described with reference to FIGS. 1-3.

As described with reference to FIG. 2, in some examples, a UE 115 and a network entity 105 may communicate optical wireless signals, such as via optical rays. For example, the UE 115 or the network entity 105 may receive or transmit the optical wireless signals via a condenser lens 415 and one or more optical communication components 430, such as photodetectors (for example, photodetectors 330) or light sources (for example, light sources 335). Some optical rays, such as boresight rays 405, may enter the condenser lens 415 and focus at a first point along a calculated or measured curved focal plane 425 of the condenser lens 415. Some other rays, such as off-axis rays 410, may enter the condenser lens 415 at an angle 420 from the boresight direction, and may focus at a second point along the curved focal plane 425.

To support receiving both boresight rays 405 and off-axis rays 410, the UE 115 or the network entity 105 may perform intra-OFE beam steering. To support performing intra-OFE beam steering, the OFE 400-*a* may include a stage 435-*a*, and the OFE 400-*b* may include a stage 435-*b* and a stage 435-*c*. The stage 435-*a* may be, for example, a 3-axis translation stage. The stage 435-*b* and the stage 435-*c* may be a 2-axis translation stage and a pan rotation stage, respectively. The UE 115 or the network entity 105 may adjust an optical communication component 430-*a* or an optical communication component 430-*b* on a curved focal plane 425-*a* of a condenser lens 415-*a* or a curved focal plane 425-*b* of a condenser lens 415-*b*, respectively. The optical communication component 430-*a* and the optical communication component 430-*b* may be, for example, light sources, photodetectors, or both. The UE 115 or the network entity 105 may perform one or more measurements on a received optical wireless signal, which may be measured as an output of the optical communication component 430-*a* or the optical communication component 430-*b*. The UE 115 or the network entity 105 may adjust the position of the optical communication component 430-*a* or the optical communication component 430-*b*, for example, if the one or more measurements fail to satisfy one or more thresholds. For example, if an SNR, an SINR, an RSRP, or any combination thereof, of the received optical wireless signal fails to satisfy a threshold SNR, a threshold SINR, a threshold RSRP, or any combination thereof, the UE 115 or the network entity 105 may adjust the position of the optical communication component 430-*a* or the optical communication component 430-*b*.

As an illustrative example, the optical communication component 430-*a* may be located at a first position along the curved focal plane 425-*a* of the condenser lens 415-*a*. The optical communication component 430-*a* may detect a boresight ray 405-*a*, and the UE 115 or the network entity 105 may determine that a measurement of the boresight ray 405-*a* satisfies a threshold and may refrain from adjusting the position of the optical communication component 430-*a* based on the measurement satisfying the threshold. The optical communication component 430-*a* may detect an off-axis ray 410-*a* from an angle 420-*a* from the boresight direction. The UE 115 or the network entity 105 may determine that a measurement of the off-axis ray 410-*a* fails to satisfy the threshold and may adjust the position of the optical communication component 430-*a* via the 3-axis translation stage 435-*a*. Due to the adjustment of the position of the optical communication component 430-*a*, a measurement (for example, SNR, SINR, RSRP) of a subsequently received off-axis ray 410-*a* (such as from the angle 420-*a*) may be greater than the measurement of the off-axis ray 410-*a*. In some examples, the UE 115 or the network entity 105 may continue to (for example, repeatedly) adjust the position of the optical communication component 430-*a* until the measurement satisfies the threshold (for example, or a second threshold greater than the threshold).

As an additional illustrative example, the optical communication component 430-*b* may be located at a first position along the curved focal plane 425-*b* of the condenser lens 415-*b*. The optical communication component 430-*b* may detect a boresight ray 405-*b*, and the UE 115 or the network entity 105 may determine that a measurement of the boresight ray 405-*b* satisfies the threshold and may refrain from adjusting the position of the optical communication component 430-*b*. The optical communication component 430-*b* may detect an off-axis ray 410-*b* from an angle 420-*b* form the boresight direction. The UE 115 or the network entity 105 may determine that a measurement of the off-axis ray 410-*b* fails to satisfy the threshold and may adjust the position of the optical communication component 430-*b* via the 2-axis translation stage 435-*b* and the rotation stage 435-*c*. Due to the adjustment of the position of the optical communication component 430-*b*, a measurement (for example, SNR, SINR, RSRP) of a subsequently received off-axis ray 410-*b* (such as from the angle 420-*b*) may be greater than the measurement of the off-axis ray 410-*b*. In some examples, the UE 115 or the network entity 105 may continue to (for example, repeatedly) adjust the position of the optical communication component 430-*b* until the measurement satisfies the threshold (for example, or a second threshold greater than the threshold). In some examples, the 2-axis translation stage may be positioned on a curved rail, which may be positioned along (for example, built according to) the curved focal plane 425-*b*. In some examples, the curved rail may be linearized at the cost of performance loss as a result of the optical communication component 430-*b* being located, in some cases, off of the curved focal plane 425-*b*.

To support beam steering in association with transmitting an optical wireless signal, the UE 115 or the network entity 105 may adjust the position of the optical communication component 430-*a* or 430-*b* using the respective stages 435. For example, the UE 115 or the network entity 105 may adjust an optical communication component 430 (for example, a light source) to various positions on a curved focal plane 425 to transmit boresight rays 405 or off-axis rays 410 using the optical communication component 430.

In some examples, OFE 400-*a* and/or OFE 400-*b* may include multiple optical communication components 430. In some examples, OFE 400-*a* and/or 400-*b* may include respective stages 435 for each of the multiple optical communication components 430 or one or more of the multiple optical communication components 430 may be coupled with (for example, positioned on) one or more shared stages 435. e multiple optical communication components 430 may be coupled the multiple photodetectors 330 and/or the multiple light sources 335 may be coupled with one or more translation and/or rotation stages. In some examples, co-located photodetectors and light sources may be on same translation and/or rotation stages or may be on respective translation and/or rotation stages.

Figure 5:
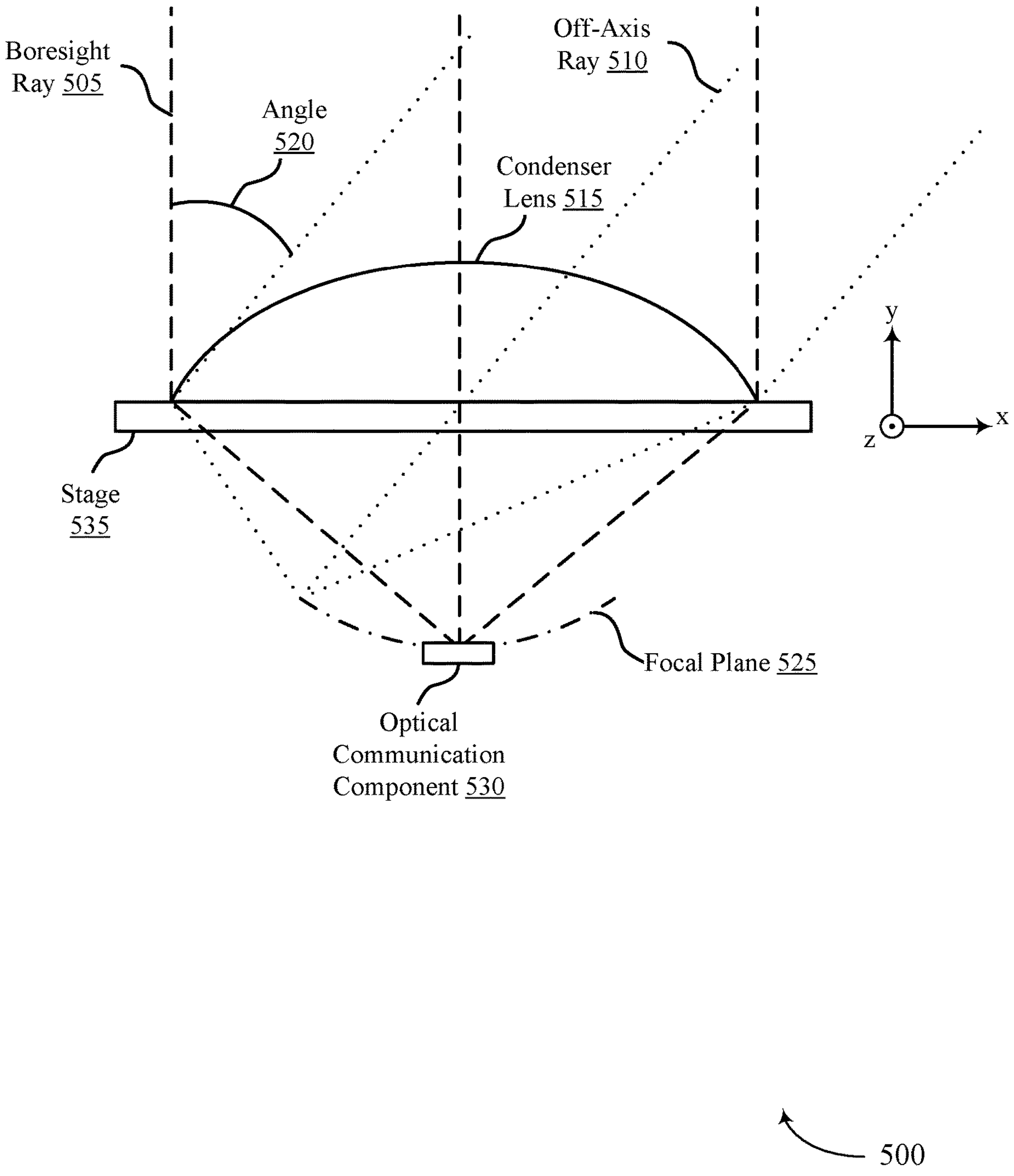
FIG. 5 shows an example of an OFE that supports utilizing curved focal planes for optical wireless communication in accordance with one or more aspects of the present disclosure.

FIG. 5 shows an example of an OFE 500 that supports utilizing curved focal planes for optical wireless communication in accordance with one or more aspects of the present disclosure. In some examples, aspects of the OFE 500 may implement or be implemented by aspects of the wireless communications system 100, the wireless communications system 200, the OFE 300, the OFE 400-*a*, and/or the OFE 400-*b*. For example, the OFE 500 may be included in or implemented by a UE 115 and/or a network entity 105, which may be examples of the corresponding devices as described with reference to FIGS. 1-4B.

As described with reference to FIG. 2, in some examples, a UE 115 or a network entity 105 may communicate optical wireless signals via optical rays. For example, the UE 115 or the network entity 105 may receive or transmit the optical wireless signals via a condenser lens 515 and one or more optical communication components 530, such as photodetectors or light sources. Some optical rays, such as boresight rays 505, may enter the condenser lens 515 and focus at a first point along a calculated or measured curved focal plane 525 of the condenser lens 515. Some other rays, such as off-axis rays 510, may enter the condenser lens 515 at an angle 520 from the boresight direction, and may focus at a second point along the curved focal plane 525.

To support receiving both boresight rays 505 and off-axis rays 510, the UE 115 or the network entity 105 may perform intra-OFE beam steering. To support performing intra-OFE beam steering, the OFE 500 may include a stage 535. The stage 535 may be, for example, a 3-axis translation stage that is coupled with the condenser lens 515. For example, the condenser lens 515 may be positioned on the stage 535. Additionally or alternatively, the OFE 500 may include a two stages 535, such as a 2-axis translation stage and a pan rotation stage as described with reference to FIG. 4B, to support the intra-OFE beam steering. The UE 115 or the network entity 105 may adjust a position of the condenser lens 515 with respect to the optical communication component 530 such that the optical communication component 530 lies in a different position on the curved focal plane 525. The optical communication component 530 may include, for example, a light source, a photodetector, or both.

The UE 115 or the network entity 105 may perform one or more measurements on a received optical wireless signal, which may be measured as an output of the optical communication component 530. The UE 115 may adjust the position of the condenser lens 515 if a measurement (for example, one or more of an SNR, an SINR, and an RSRP) of the received optical wireless signal fails to satisfy a threshold (for example, an SNR threshold an SINR threshold, an RSRP threshold).

As an illustrative example, the optical communication component 530 may be located at a first position on the curved focal plane 525 of the condenser lens 515. The optical communication component 530 may detect a boresight ray 505. The UE 115 or the network entity 105 may determine that a measurement of the boresight ray 505 satisfies the threshold and may refrain from adjusting the position of the optical communication component 530. The optical communication component 530 may detect an off-axis ray 510 from an angle 520 form the boresight direction. The UE 115 or the network entity 105 may determine that a measurement of the off-axis ray 510 fails to satisfy the threshold and may adjust the position of the condenser lens 515 via the translation stage 535 such that the position of the optical communication component 530 on the curved focal plane 525 is adjusted. Due to the adjustment of the position of the optical communication component 530 on the curved focal plane 525, a measurement (for example, SNR, SINR, RSRP) of a subsequently received off-axis ray 510 (such as from the angle 520) may be greater than the measurement of the off-axis ray 510. In some examples, the UE 115 or the network entity 105 may continue to (for example, repeatedly) adjust the position of the condenser lens 515 until the measurement satisfies the threshold (for example, or a second threshold greater than the threshold).

To support beam steering in association with transmitting an optical wireless signal, the UE 115 or the network entity 105 may adjust the position of the condenser lens 515 using the stage 535. For example, the UE 115 or the network entity 105 may adjust an optical communication component 530 (for example, a light source) to various positions on a curved focal plane 525 by adjusting the condenser lens 515 to transmit boresight rays 505 or off-axis rays 510 using the optical communication component 530.

In some examples, the stage 535 may be a motorized 3-axis translation stage. In some examples, the stage 535 may be a voice-coil-motor based translation stage. For example, the stage 535 may include optical image stabilization (OIS) coils in a fixed base and magnets in a moving base holding the condenser lens 515. The UE 115 may adjust the position of the condenser lens 515 by applying a current across the OIS coils to move the magnets.

In some examples, the UE 115 may adjust the position of the condenser lens 515 without adjusting the position of the optical communication component 530. In some examples, the UE 115 may adjust both the position of the condenser lens 515 and the position of the optical communication component 530. For example, the UE 115 may adjust the position of the optical communication component 530 as described with reference to FIGS. 4A and 4B.

Figure 6A:
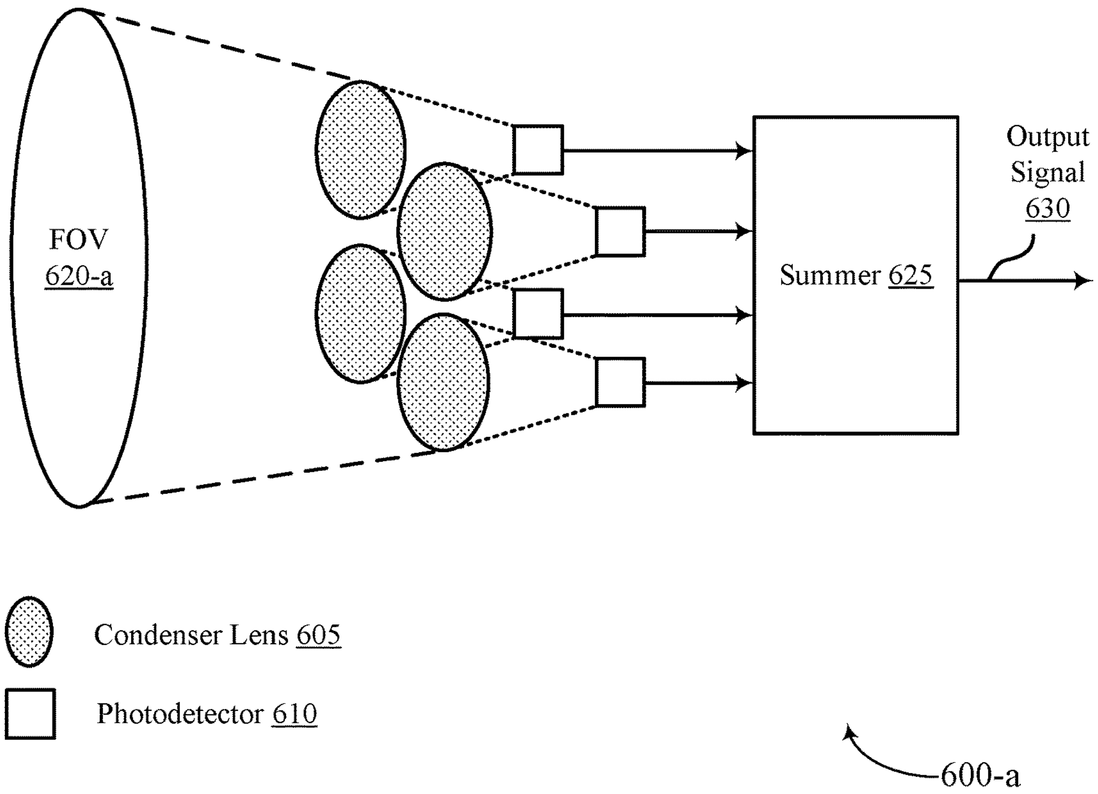
FIGS. 6A and 6B show examples of optical communication systems that support utilizing curved focal planes for optical wireless communication in accordance with one or more aspects of the present disclosure.
Figure 6B:
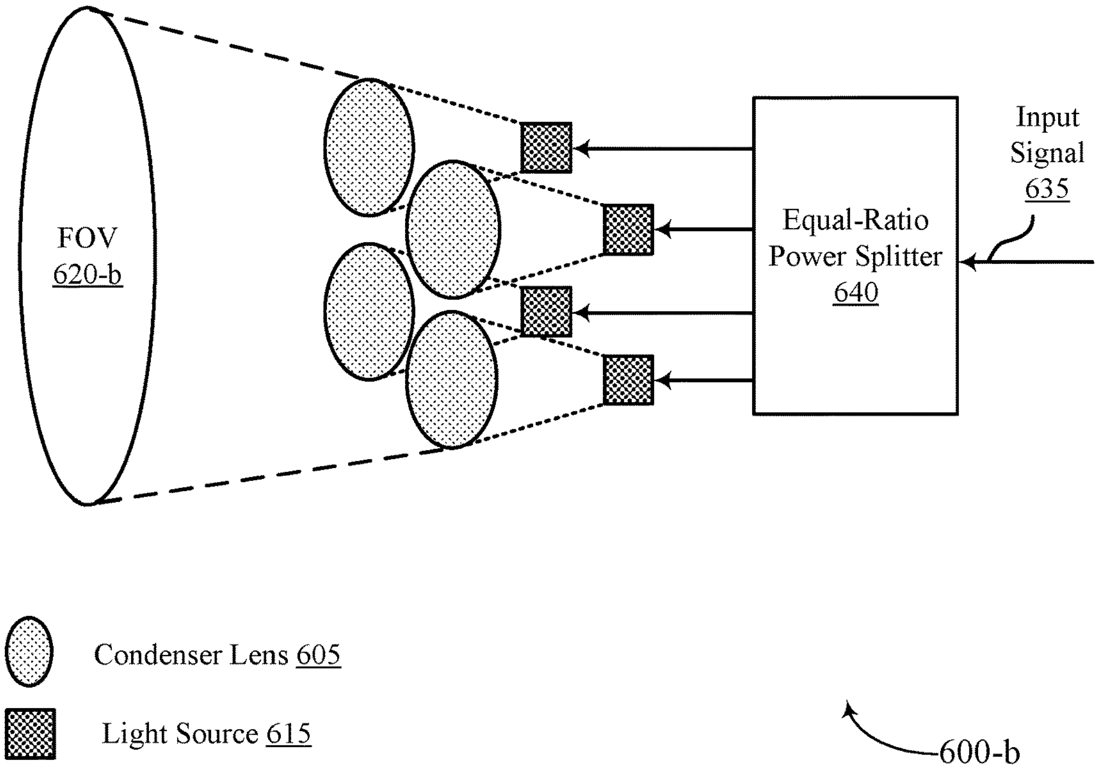

FIGS. 6A and 6B show examples of an optical communication system 600-*a* and an optical communication system 600-*b*, respectively, that support utilizing curved focal planes for optical wireless communication in accordance with one or more aspects of the present disclosure. In some examples, aspects of the optical communication system 600-*a* and the optical communication system 600-*b* may implement or be implemented by aspects of the wireless communications system 100, the wireless communications system 200, the OFE 300, the OFE 400-*a*, the OFE 400-*b*, and/or the OFE 500. For example, the optical communication system 600-*a* and the optical communication system 600-*b* may be included in or implemented by a UE 115 and/or a network entity 105, which may be examples of the corresponding devices as described with reference to FIGS. 1-5.

An OFE of a UE 115 or a network entity 105 may include an optical communication system 600-*a* including multiple OFE components. Each OFE component may include an optical communication component, such as a photodetector 610, and one or more condenser lenses 605, which may include of one or more aspheric or convex lenses forming a condensing sub-system. Each photodetector 610 may be optically coupled with the corresponding condenser lens 605 and positioned on a respective curved focal plane of the corresponding condenser lens 605. Each OFE component may receive optical wireless signals from a shared FOV 620-*a*. That is, each respective set of one or more condenser lenses 605 and photodetector 610 may be associated with the same FOV 620-*a*. In some examples, the optical communication system 600-*a* may be referred to an optical subarray system, for example, due to including multiple subarrays of photodetectors 610 and condenser lenses 605.

Each OFE component may output, via the photodetector 610, a homogenous (for example, near homogenous) electrical signals representing measurements of a received optical wireless signal. That is, due to the shared FOV 620-*a* and a shared spatial relationship between each photodetector 610 and condenser lens 605, each photodetector 610 may output a similar electrical signal, such as near enough to homogenous such that equal gain combination of the respectively output electrical signals may be performed.

The UE 115 may combine the electrical signals from each photodetector 610 using a summer 625. The summer 625 may perform analog equal gain combination over an operation amplifier to produce an output signal 630. The output signal 630 may have a larger total gain than each electrical signal output directly from each photodetector 610, and may result in an overall increased quality of communication relative to a single condenser lens 605 and photodetector 610 system.

Additionally, or alternatively, the OFE of the UE 115 or network entity 105 may include an optical communication system 600-*b* including multiple OFE components. Each OFE component may include an optical communication component, such as a light source 615, and one or more condenser lenses 605, which may include of one or more aspheric or convex lenses forming a condensing sub-system (which may be referred to as a collimating sub-system in the context of transmitting optical wireless signals). Each light source 615 may be optically coupled with the corresponding condenser lens 605 and positioned on a respective curved focal plane of the corresponding condenser lens 605. Each OFE component may transmit optical wireless signals to a shared FOV 620-*b*. In some examples, the optical communication system 600-*b* may be referred to an optical subarray system, for example, due to including multiple subarrays of light sources 615 and condenser lenses 605.

To transmit an optical wireless signal using the optical communication system 600-*b*, the UE 115 or network entity

105 may drive, using a same power amplifier, a signal to the light sources 615 via an equal ratio power splitter 640. For example, the UE 115 may amplify an input signal 635 via an amplifier. The UE 115 may perform equal-ratio power splitting via an equal-ratio power splitter 640 to split the amplified input signal 635 to each light source 615. The UE 115 may transmit the resulting signal using each light source 615, for example, to a network entity 105 in the shared FOV 620-*b*.

The UE 115 or the network entity 105 may perform intra-OFE beam steering by adjusting the positions of the photodetectors 610 and/or the light sources 615 using one or more translation and/or rotation stages, as described with reference to FIGS. 4A and 4B. For example, the UE 115 or network entity 105 may adjust the location of the photodetectors 610 and/or the light sources 615 on the respective curved focal plane of each corresponding condenser lens 605. In some examples, the UE 115 or network entity 105 may move each photodetector 610 and/or light source 615 of the optical communication system 600-*a* and the optical communication system 600-*b*, respectively, using a respective translation and/or rotation stages. In some examples, the UE 115 may move each photodetector 610 and/or light source 615 of the optical communication system 600-*a* and the optical communication system 600-*b*, respectively, using shared motorized translation and/or rotation stages. Such techniques may allow for a reduced total mechanical traveling distance as compared to moving each photodetector 610 and/or light source 615 using a different translation stage.

Additionally, or alternatively, the UE 115 or network entity 105 may perform intra-OFE beam steering by adjusting the positions of the condenser lenses 605, as described in further detail with reference to FIG. 5. For example, the UE 115 or network entity 105 may adjust the positions of the condenser lenses 605 such that the photodetectors 610 and/or the light sources 615 are positioned in a different location on the respective curved focal plane of the corresponding condenser lens 605.

Figure 7A:
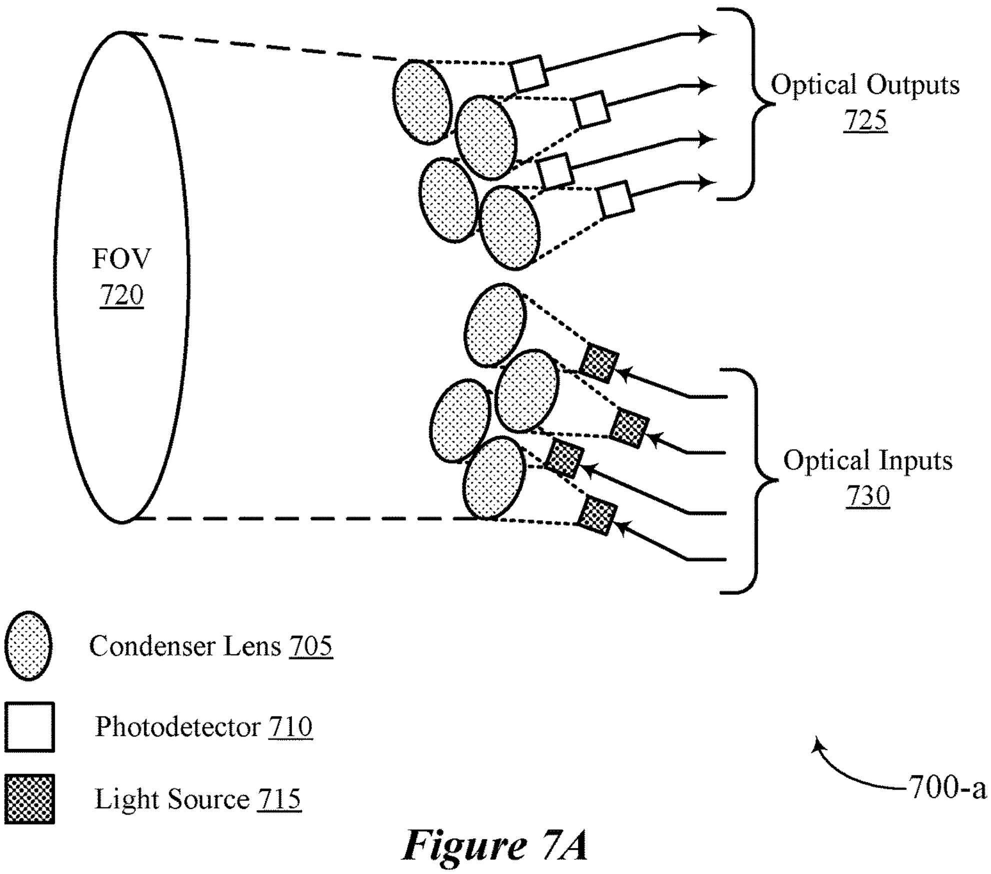
FIGS. 7A and 7B show examples of optical communication systems that support utilizing curved focal planes for optical wireless communication in accordance with one or more aspects of the present disclosure.
Figure 7B:
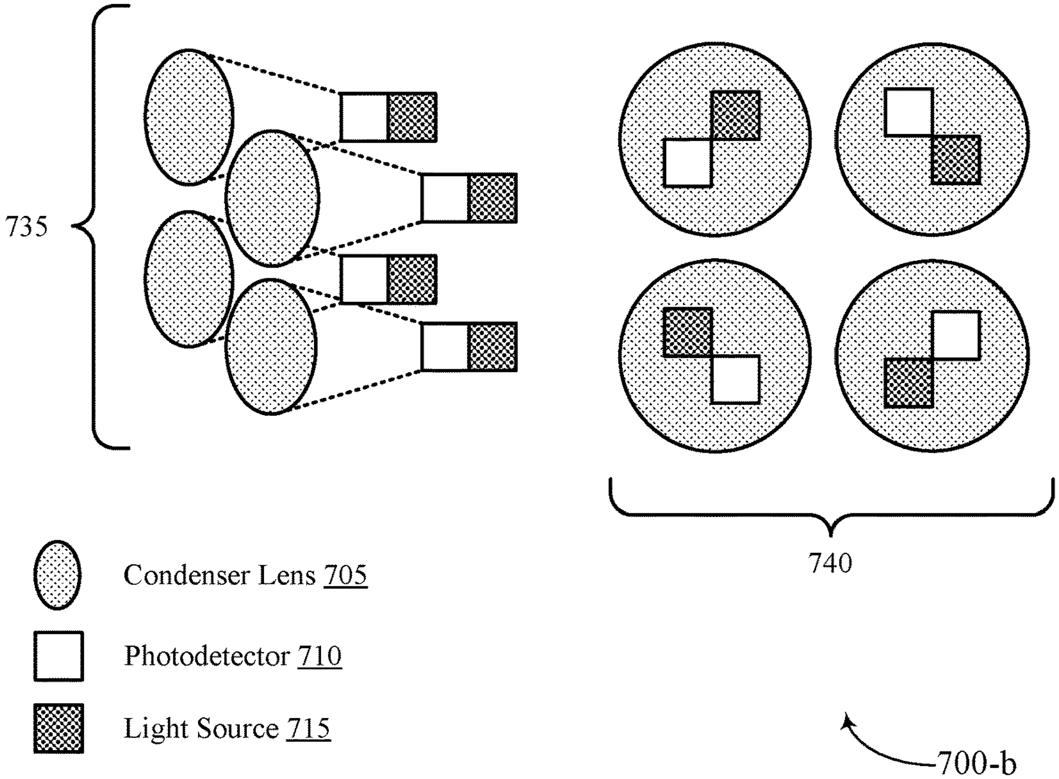

FIGS. 7A and 7B show examples of an optical communication system 700-*a* and an optical communication system 700-*b*, respectively, that support utilizing curved focal planes for optical wireless communication in accordance with one or more aspects of the present disclosure. In some examples, aspects of the optical communication system 700-*a* and the optical communication system 700-*b* may implement or be implemented by aspects of the wireless communications system 100, the wireless communications system 200, the OFE 300, the OFE 400-*a*, the OFE 400-*b*, the OFE 500, the optical communication system 600-*a*, and/or the optical communication system 600-*b*. For example, the optical communication system 700-*a* and the optical communication system 700-*b* may include a UE 115 and/or a network entity 105, which may be examples of the corresponding devices as described with reference to FIGS. 1-6B.

In some implementations, an OFE of a UE 115 or a network entity 105 may include multiple optical communication systems 700. For example, the OFE may include a receiving optical communication system containing multiple condenser lenses 705 and multiple photodetectors 710 each optically coupled with one or more respective condenser lenses 705, as described with reference to FIG. 6A. The OFE of the UE 115 may further include a transmitting optical communication system containing multiple condenser lenses 705 and multiple light sources 715 each optically coupled with one or more respective condenser lenses 705, as described with reference to FIG. 6B.

The receiving optical communication system and the transmitting optical communication system may receive and transmit optical wireless signals, respectively, over a shared FOV 720. That is, the UE 115 or network entity 105 may receive optical wireless signals in the shared FOV 720 via the receiving optical communication system. The multiple photodetectors 710 may detect the optical wireless signals and output optical outputs 725, such as to a summer 625. The UE 115 or network entity 105 may perform equal gain combination on the optical outputs 725 as described with reference to FIG. 6A. Additionally, or alternatively, the UE 115 or network entity 105 may transmit optical wireless signals in the shared FOV 720 via the transmitting optical communication system. That is, the UE 115 or network entity 105 may perform equal-ratio power splitting on an optical wireless signal to generate optical inputs 730 for the multiple light sources 715 via an equal-ratio power splitter as described with reference to FIG. 6B.

In some examples, the UE 115 or the network entity 105 may adjust the positions of the multiple photodetectors 710 and/or the multiple light sources 715 in accordance with a measurement of the optical outputs 725 of the photodetectors 710, or a desired beam direction for the light sources 715, respectively. For example, the UE 115 or the network entity 105 may perform intra-OFE beam steering of the transmitting and/or receiving optical communication systems using one or more translation or rotation stages, as described with reference to FIGS. 4A and 4B. In some examples, the UE 115 or the network entity 105 may perform intra-OFE beam steering by adjusting the positions of the multiple condenser lenses 705 as described with reference to FIG. 5.

In some examples, the optical communication system 700-*b* may include both photodetectors 710 and light sources 715 such that the UE 115 may transmit and receive optical wireless signals using a same optical communication system 700-*b*. For example, the optical communication system 700-*b* may include multiple photodetectors 710 co-located with (for example, adjacent to) multiple light sources 715. The light sources 715 and the photodetectors 710 may be optically coupled with a shared corresponding condenser lens 705 and placed on a curved focal plane of the shared corresponding condenser lens 705, as illustrated by the optical communication system 735. In some examples, to achieve a uniform overlapping of the FOV of the light sources 715 and the photodetectors 710, the light sources 715 and the photodetectors 710 may be arranged in an interleaved pattern, as illustrated by the layout 740.

In some implementations, the UE 115 or the network entity 105 may adjust the positions of the multiple photodetectors 710 and the multiple light sources 715 in accordance with a measurement of the optical outputs 725 of the photodetectors 710, or a desired beam direction for the light sources 715, respectively. For example, the UE 115 or network entity 105 may perform intra-OFE beam steering of the optical communication system 700-*b* using one or more translation or rotation stages, as described with reference to FIGS. 4A and 4B. In some examples, the UE 115 or network entity 105 may adjust the positions of the multiple photodetectors 710 and the multiple light sources 715 using one or more shared translation or rotation stages. In some examples, the UE 115 or network entity 105 may perform intra-OFE beam steering by adjusting the positions of the multiple condenser lenses 705 as described with reference to FIG. 5.

Figure 8:
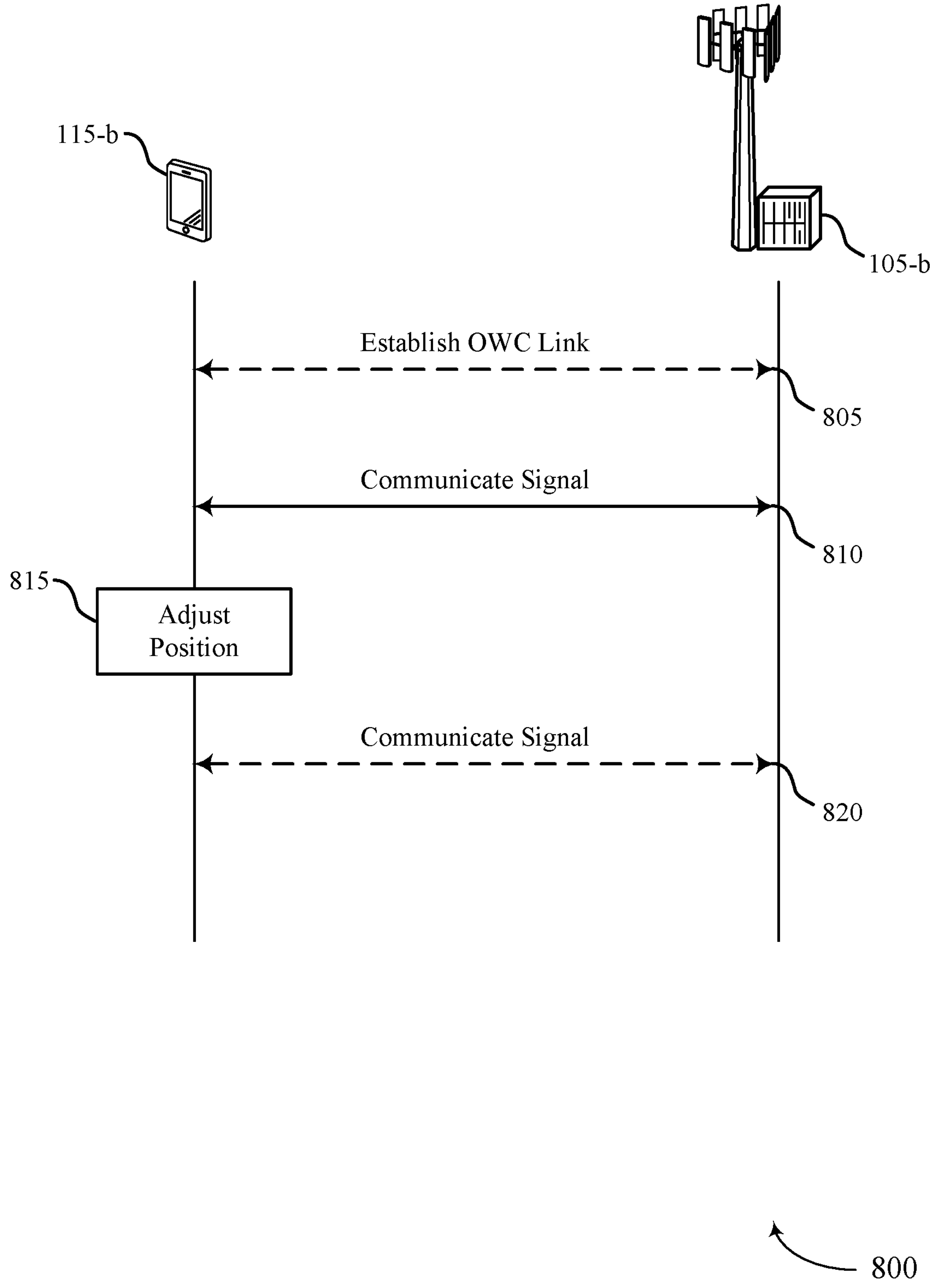
FIG. 8 shows an example of a process flow that supports utilizing curved focal planes for optical wireless communication in accordance with one or more aspects of the present disclosure.

FIG. 8 shows an example of a process flow 800 that supports utilizing curved focal planes for optical wireless communication in accordance with one or more aspects of the present disclosure. In some examples, aspects of the process flow 800 may implement or be implemented by aspects of the wireless communications system 100, the wireless communications system 200, the OFE 300, the OFE 400-*a*, the OFE 400-*b*, the OFE 500, the optical communication system 600-*a*, the optical communication system 600-*b*, the optical communication system 700-*a*, and/or the optical communication system 700-*b*. For example, the process flow 800 may be implemented by a UE 115-*b* and a network entity 105-*b*, which may be examples of the corresponding devices as described with reference to FIGS. 1-7B.

In the following description of the process flow 800, the operations between the network entity 105-*b* and the UE 115-*b* may be performed in a different order than the example order shown. Some operations may also be omitted from the process flow 800, and other operations may be added to the process flow 800. Further, although some operations or signaling may be shown to occur at different times for discussion purposes, these operations may actually occur at the same time.

In some examples, at 805, the UE 115-*b* may establish an optical wireless communication link with the network entity 105-*b*. For example, the UE 115-*b* may establish the optical wireless communication link with the network entity 105-*b* using one or more optical communication components of the UE 115-*b*. The optical communication components may be, for example, a photodetector, a light source, or a combination thereof.

At 810, the UE 115-*b* may communicate a first optical wireless signal with the network entity 105-*b* using the optical communication component of the UE 115-*b* via a condenser lens of the UE 115-*b*. For example, the UE 115-*b* may receive the first optical wireless signal via the condenser lens and using the photodetector. In some examples, the UE 115-*b* may transmit the first optical wireless signal using the light source and via the condenser lens.

At 815, the UE 115-*b* may adjust a position of the optical communication component of the UE 115-*b* according to a measurement of the first optical wireless signal. For example, the UE 115-*b* may adjust the position of the optical communication component if one or more of an SNR, an SINR, and an RSRP fail to satisfy a threshold. The UE 115-*b* may adjust the position of the optical communication component from a first position on a curved focal plane of the condenser lens of the UE 115-*b* to a second position along the curved focal plane of the condenser lens. In some examples, the UE 115-*b* may adjust the position of the optical communication component using one or more of a 3-axis translation stage, a 2-axis translation stage, and a pan rotation stage. In some examples, the UE 115-*b* may adjust the position of the optical communication component, such as the light source, to adjust a beam direction for a subsequently transmitted optical wireless signal.

In some examples, the UE 115-*b* may adjust a position of the condenser lens from a third position to a fourth position. That is, the UE may adjust the relative position of the optical communication component on the curved focal plane from the first position to the second position by moving the condenser lens from the third position to the fourth position.

In some examples, at 820, the UE 115-*b* may communicate a second optical wireless signal with the network entity 105-*b* after adjusting the position of the optical communication component. For example, the UE 115-*b* may receive the second optical wireless signal via the photodetector. In some examples, the UE 115-*b* may transmit the second optical wireless signal via the light source. In some examples, a second measurement of the second optical wireless signal may be greater than the measurement of the first optical wireless signal, such as due to the adjustment of the position of the optical communication component. For example, the second measurement of the second optical wireless signal may satisfy the threshold, such as due to the photodetector being positioned closer to a focal point of the received second optical wireless signal.

Figure 9:
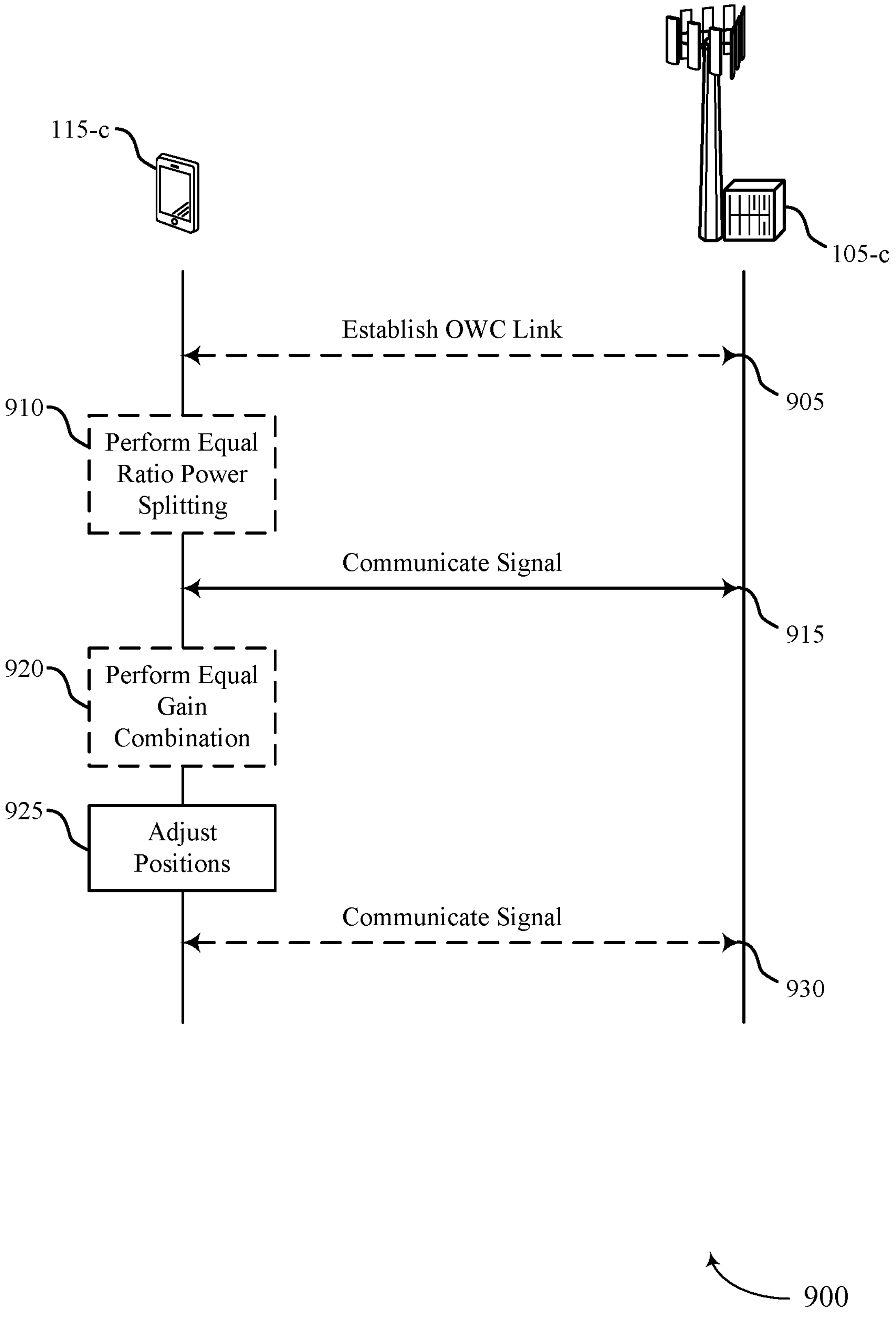
FIG. 9 shows an example of a process flow that supports utilizing curved focal planes for optical wireless communication in accordance with one or more aspects of the present disclosure.

FIG. 9 shows an example of a process flow 900 that supports utilizing curved focal planes for optical wireless communication in accordance with one or more aspects of the present disclosure. In some examples, aspects of the process flow 900 may implement or be implemented by aspects of the wireless communications system 100, the wireless communications system 200, the OFE 300, the OFE 400-*a*, the OFE 400-*b*, the OFE 500, the optical communication system 600-*a*, the optical communication system 600-*b*, the optical communication system 700-*a*, the optical communication system 700-*b*, and/or the process flow 800. For example, the process flow 900 may be implemented by a UE 115-*c* and a network entity 105-*c*, which may be examples of the corresponding devices as described with reference to FIGS. 1-9.

In the following description of the process flow 900, the operations between the network entity 105-*c* and the UE 115-*c* may be performed in a different order than the example order shown. Some operations may also be omitted from the process flow 900, and other operations may be added to the process flow 900. Further, although some operations or signaling may be shown to occur at different times for discussion purposes, these operations may actually occur at the same time.

In some examples, at 905, the UE 115-*c* may establish an optical wireless communication link with the network entity 105-*c*. For example, the UE 115-*c* may establish the optical wireless communication link with the network entity 105-*c* using multiple optical communication components of the UE 115-*c*. The multiple optical communication components may be, for example, photodetectors, light sources, or both. The multiple optical communication components may be components of an optical communication system. That is, the multiple optical communication components may each be optically coupled with and placed on a respective curved focal plane of a corresponding condenser lens.

In some examples, at 910, the UE 115-*c* may perform equal-ratio power splitting on a first optical wireless signal. That is, the UE 115-*c* may use a same amplifier and an equal-ratio power splitter to drive a signal to the light sources in the optical communication system.

At 915, the UE 115-*c* may communicate the second optical wireless signal with the network entity 105-*c* via the multiple optical communication components of the UE 115-*c*. For example, the UE 115-*c* may receive the first optical wireless signal via the photodetectors. Alternatively, the UE 115-*c* may transmit the first optical wireless signal via the light sources. For example, the light sources may transmit the first optical wireless signal corresponding to the signal driven to the light sources. That is, the light sources may each emit a respective optical wireless signal corresponding the signal that may together be the first optical wireless signal In some examples, at 920, the UE 115-*c* may perform equal gain combination on the first optical wireless signal. That is, the UE 115-*c* may use a summer to combine output signals of the photodetectors in the optical communication system after receiving the first optical wireless signal at the photodetectors.

At 925, the UE 115-*c* may adjust positions of the optical communication components of the UE 115-*c* according to a measurement of the first optical wireless signal. For example, the UE 115-*c* may adjust the positions of the optical communication components if one or more of an SNR, an SINR, and an RSRP fail to satisfy a threshold. Additionally or alternatively, the UE 115-*c* may adjust the positions of the optical communication components such as the light sources, to adjust a beam direction for a subsequently transmitted optical wireless signal. The UE 115-*c* may adjust the positions of the optical communication components from respective first positions on the curved focal planes of the corresponding condenser lenses of the UE 115-*c* to respective second positions on the curved focal planes of the corresponding condenser lenses. In some examples, the UE 115-*c* may adjust the positions of the optical communication components using one or more 3-axis translation stages, 2-axis translation stages, and pan rotation stages.

In some examples, the UE 115-*c* may adjust positions of the condenser lenses from respective third positions to respective fourth positions. That is, the UE may adjust the relative position of the corresponding optical communication components on the respective curved focal planes from the respective first positions to the respective second positions by moving the condenser lenses from the respective third positions to the respective fourth positions.

In some examples, at 930, the UE 115-*c* may communicate a second optical wireless signal with the network entity 105-*c* after adjusting the positions of the optical communication components. For example, the UE 115-*c* may receive the second optical wireless signal via the photodetectors. In some examples, the UE 115-*c* may transmit the second optical wireless signal via the light sources. In some examples, a second measurement of the second optical wireless signal may be greater than the measurement of the first optical wireless signal, such as due to the adjustment of the positions of the optical communication components. For example, the second measurement of the second optical wireless signal may satisfy the threshold, such as due to the photodetectors being positioned closer to a focal point of the received second optical wireless signal.

Figure 10:
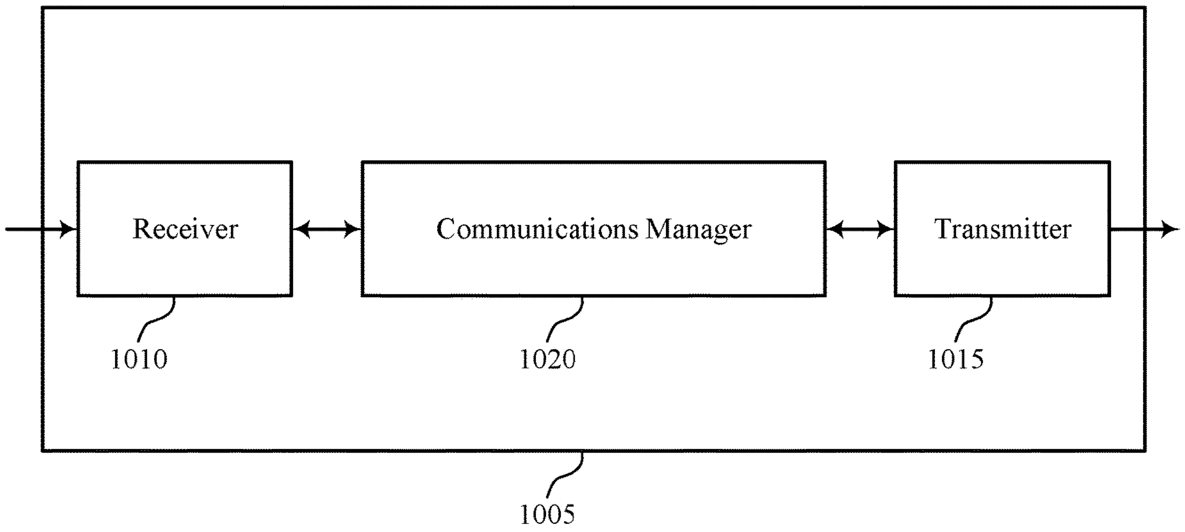
FIGS. 10 and 11 show block diagrams of devices that support utilizing curved focal planes for optical wireless communication in accordance with one or more aspects of the present disclosure.

FIG. 10 shows a block diagram of a device 1005 that supports utilizing curved focal planes for optical wireless communication in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to utilizing curved focal planes for optical wireless communication). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to utilizing curved focal planes for optical wireless communication). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of utilizing curved focal planes for optical wireless communication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support optical wireless communications at a UE in accordance with examples as disclosed herein. For example, the communications manager 1020 is capable of, configured to, or operable to support a means for communicating, with the network entity via an optical wireless communication link, a first optical wireless signal using an optical communication component of the UE. The communications manager 1020 is capable of, configured to, or operable to support a means for adjusting the optical communication component from a first position on a curved focal plane associated with a condenser lens via which the first optical wireless signal is communicated to a second position on the curved focal plane in accordance with a measurement of the first optical wireless signal. The communications manager 1020 is capable of, configured to, or operable to support a means for communicating, via the optical wireless communication link after adjusting the optical communication component, a second optical wireless signal using the adjusted optical communication component.

Additionally, or alternatively, the communications manager 1020 may support optical wireless communications at a UE in accordance with examples as disclosed herein. For example, the communications manager 1020 is capable of, configured to, or operable to support a means for communicating, with a network entity via an optical wireless communication link, a first optical wireless signal using an optical communication system including a set of multiple lenses and a set of multiple optical communication components that are each optically coupled with a respective lens of the set of multiple lenses. The communications manager 1020 is capable of, configured to, or operable to support a means for adjusting the set of multiple optical communication components from a respective first position on a respective curved focal plane associated with the respective lens to a respective second position on the respective curved focal plane in accordance with a measurement of the first optical wireless signal. The communications manager 1020 is capable of, configured to, or operable to support a means for communicating, via the optical wireless communication link after adjusting the set of multiple optical communication components, a second optical wireless signal using the adjusted set of multiple optical communication components.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for utilizing curved focal planes and/or an optical communication system for optical wireless communication, which may allow for reduced power consumption, higher spectrum efficiency, and more efficient utilization of communication resources, such as due to supporting beam management for optical wireless communication, for example, while implementing smaller and lighter translation apparatuses.

Figure 11:
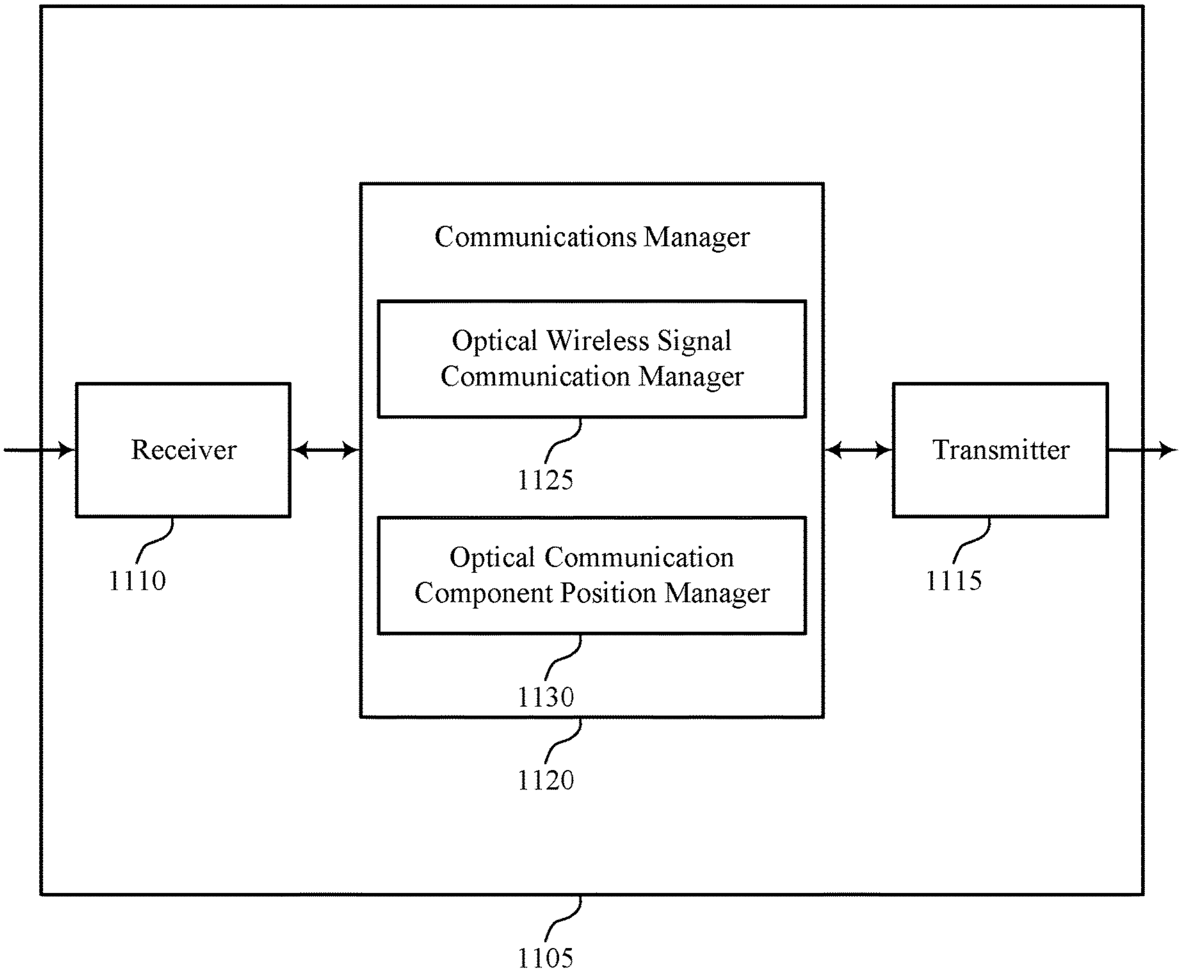

FIG. 11 shows a block diagram of a device 1105 that supports utilizing curved focal planes for optical wireless communication in accordance with one or more aspects of the present disclosure. The device 1105 may be an example of aspects of a device 1005 or a UE 115 as described herein. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to utilizing curved focal planes for optical wireless communication). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to utilizing curved focal planes for optical wireless communication). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of utilizing curved focal planes for optical wireless communication as described herein. For example, the communications manager 1120 may include an optical wireless signal communication manager 1125 an optical communication component position manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support optical wireless communications at a UE in accordance with examples as disclosed herein. The optical wireless signal communication manager 1125 is capable of, configured to, or operable to support a means for communicating, with the network entity via an optical wireless communication link, a first optical wireless signal using an optical communication component of the UE. The optical communication component position manager 1130 is capable of, configured to, or operable to support a means for adjusting the optical communication component from a first position on a curved focal plane associated with a condenser lens via which the first optical wireless signal is communicated to a second position on the curved focal plane in accordance with a measurement of the first optical wireless signal. The optical wireless signal communication manager 1125 is capable of, configured to, or operable to support a means for communicating, via the optical wireless communication link after adjusting the optical communication component, a second optical wireless signal using the adjusted optical communication component.

Additionally, or alternatively, the communications manager 1120 may support optical wireless communications at a UE in accordance with examples as disclosed herein. The optical wireless signal communication manager 1125 is capable of, configured to, or operable to support a means for communicating, with a network entity via an optical wireless communication link, a first optical wireless signal using an optical communication system including a set of multiple lenses and a set of multiple optical communication components that are each optically coupled with a respective lens of the set of multiple lenses. The optical communication component position manager 1130 is capable of, configured to, or operable to support a means for adjusting the set of multiple optical communication components from a respective first position on a respective curved focal plane associated with the respective lens to a respective second position on the respective curved focal plane in accordance with a measurement of the first optical wireless signal. The optical wireless signal communication manager 1125 is capable of, configured to, or operable to support a means for communicating, via the optical wireless communication link after adjusting the set of multiple optical communication components, a second optical wireless signal using the adjusted set of multiple optical communication components.

Figure 12:
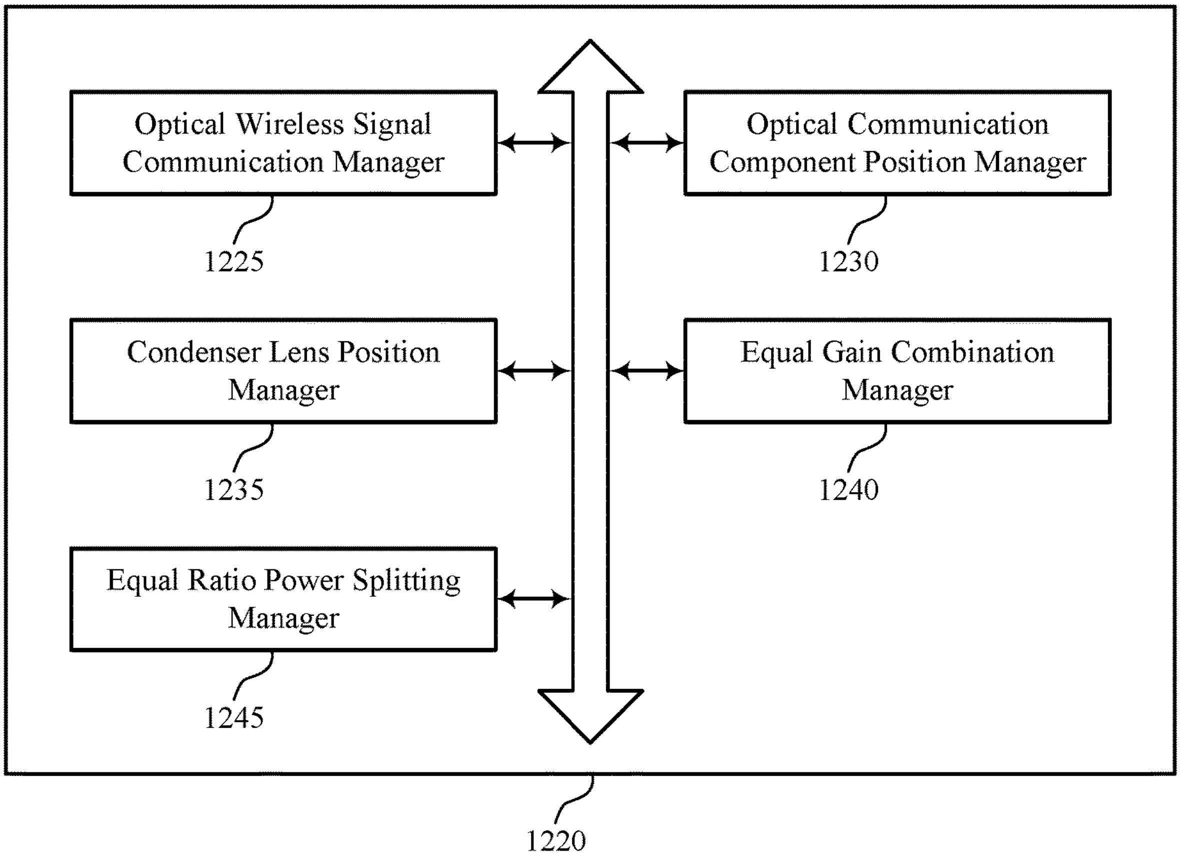
FIG. 12 shows a block diagram of a communications manager that supports utilizing curved focal planes for optical wireless communication in accordance with one or more aspects of the present disclosure.

FIG. 12 shows a block diagram of a communications manager 1220 that supports utilizing curved focal planes for optical wireless communication in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of utilizing curved focal planes for optical wireless communication as described herein. For example, the communications manager 1220 may include an optical wireless signal communication manager 1225, an optical communication component position manager 1230, a condenser lens position manager 1235, an equal gain combination manager 1240, an equal-ratio power splitting manager 1245, or any combination thereof. Each of these components may communicate, directly or indirectly, with one another (e.g., via one or more buses).

The communications manager 1220 may support optical wireless communications at a UE in accordance with examples as disclosed herein. The optical wireless signal communication manager 1225 is capable of, configured to, or operable to support a means for communicating, with the network entity via an optical wireless communication link, a first optical wireless signal using an optical communication component of the UE. The optical communication component position manager 1230 is capable of, configured to, or operable to support a means for adjusting the optical communication component from a first position on a curved focal plane associated with a condenser lens via which the first optical wireless signal is communicated to a second position on the curved focal plane in accordance with a measurement of the first optical wireless signal. In some examples, the optical wireless signal communication manager 1225 is capable of, configured to, or operable to support a means for communicating, via the optical wireless communication link after adjusting the optical communication component, a second optical wireless signal using the adjusted optical communication component.

In some examples, a second measurement of the second optical wireless signal is greater than the measurement of the first optical wireless signal in accordance with the adjustment of the optical communication component.

In some examples, to support adjusting the optical communication component, the optical communication component position manager 1230 is capable of, configured to, or operable to support a means for adjusting the optical communication component from the first position to the second position using a three-axis translation stage.

In some examples, to support adjusting the optical communication component, the optical communication component position manager 1230 is capable of, configured to, or operable to support a means for adjusting the optical communication component from the first position to the second position using a two-axis translation stage and a rotation stage.

In some examples, to support adjusting the optical communication component, the optical communication component position manager 1230 is capable of, configured to, or operable to support a means for adjusting the optical communication component from the first position to the second position in accordance with the measurement of the first optical wireless signal failing to satisfy a threshold.

In some examples, to support adjusting the optical communication component from the first position to the second position, the condenser lens position manager 1235 is capable of, configured to, or operable to support a means for adjusting the condenser lens from a third position to a fourth position to adjust a relative position of the optical communication component on the curved focal plane from the first position to the second position.

In some examples, to support communicating the first optical wireless signal, the optical wireless signal communication manager 1225 is capable of, configured to, or operable to support a means for receiving the first optical wireless signal using the optical communication component, the optical communication component including a photodetector.

In some examples, to support communicating the first optical wireless signal, the optical wireless signal communication manager 1225 is capable of, configured to, or operable to support a means for transmitting the first optical wireless signal using the optical communication component, the optical communication component including a light source.

In some examples, the measurement of the first optical wireless signal includes an SNR, an SINR, an RSRP, or a combination thereof.

Additionally, or alternatively, the communications manager 1220 may support optical wireless communications at a UE in accordance with examples as disclosed herein. In some examples, the optical wireless signal communication manager 1225 is capable of, configured to, or operable to support a means for communicating, with a network entity via an optical wireless communication link, a first optical wireless signal using an optical communication system including a set of multiple lenses and a set of multiple optical communication components that are each optically coupled with a respective lens of the set of multiple lenses. In some examples, the optical communication component position manager 1230 is capable of, configured to, or operable to support a means for adjusting the set of multiple optical communication components from a respective first position on a respective curved focal plane associated with the respective lens to a respective second position on the respective curved focal plane in accordance with a measurement of the first optical wireless signal. In some examples, the optical wireless signal communication manager 1225 is capable of, configured to, or operable to support a means for communicating, via the optical wireless communication link after adjusting the set of multiple optical communication components, a second optical wireless signal using the adjusted set of multiple optical communication components.

In some examples, to support communicating first optical wireless signal, the optical wireless signal communication manager 1225 is capable of, configured to, or operable to support a means for receiving the first optical wireless signal via the set of multiple optical communication components, the set of multiple optical communication components including a set of multiple photodetectors. In some examples, to support communicating first optical wireless signal, the equal gain combination manager 1240 is capable of, configured to, or operable to support a means for performing an equal gain combination operation on a set of multiple signals output by the set of multiple photodetectors in accordance with the reception of the first optical wireless signal.

In some examples, the set of multiple optical communication components includes a set of multiple light sources. In some examples, to support communicating the first optical wireless signal, the equal-ratio power splitting manager 1245 is capable of, configured to, or operable to support a means for driving, using a same power amplifier, a signal to the set of multiple light sources via an equal-ratio power splitter. In some examples, to support communicating the first optical wireless signal, the optical wireless signal communication manager 1225 is capable of, configured to, or operable to support a means for transmitting the first optical wireless signal corresponding to the signal using the set of multiple light sources.

In some examples, to support adjusting the set of multiple optical communication components, the optical communication component position manager 1230 is capable of, configured to, or operable to support a means for adjusting the set of multiple optical communication components from the respective first position to the respective second position using one or more three-axis translation stages or one or more two-axis translation stages and one or more rotation stages.

In some examples, to support adjusting the set of multiple optical communication components, the optical communication component position manager 1230 is capable of, configured to, or operable to support a means for adjusting the set of multiple optical communication components from the respective first position to the respective second position in accordance with the measurement of the first optical wireless signal failing to satisfy a threshold.

Figure 13:
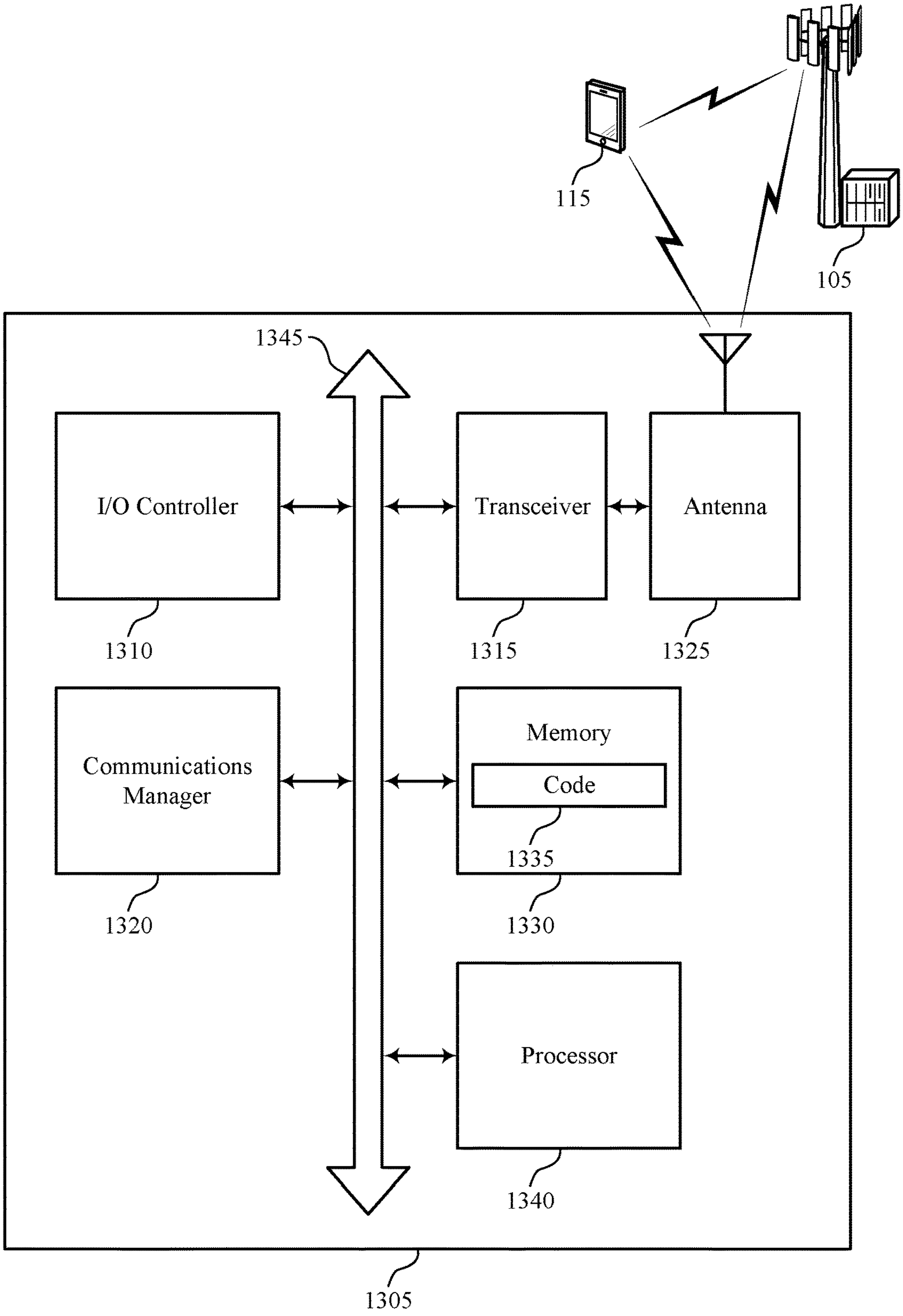
FIG. 13 shows a diagram of a system including a device that supports utilizing curved focal planes for optical wireless communication in accordance with one or more aspects of the present disclosure.

FIG. 13 shows a diagram of a system including a device 1305 that supports utilizing curved focal planes for optical wireless communication in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable code 1335 including instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may contain, among other things, a basic I/O system (BIOS) which may control basic hardware or software operation such as the interaction with peripheral components or devices.

The at least one processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting utilizing curved focal planes for optical wireless communication). For example, the device 1305 or a component of the device 1305 may include at least one processor 1340 and at least one memory 1330 coupled with or to the at least one processor 1340, the at least one processor 1340 and at least one memory 1330 configured to perform various functions described herein. In some examples, the at least one processor 1340 may include multiple processors and the at least one memory 1330 may include multiple memories. One or more of the multiple processors may be coupled with one or more of the multiple memories, which may, individually or collectively, be configured to perform various functions herein.

The communications manager 1320 may support optical wireless communications at a UE in accordance with examples as disclosed herein. For example, the communications manager 1320 is capable of, configured to, or operable to support a means for communicating, with the network entity via an optical wireless communication link, a first optical wireless signal using an optical communication component of the UE. The communications manager 1320 is capable of, configured to, or operable to support a means for adjusting the optical communication component from a first position on a curved focal plane associated with a condenser lens via which the first optical wireless signal is communicated to a second position on the curved focal plane in accordance with a measurement of the first optical wireless signal. The communications manager 1320 is capable of, configured to, or operable to support a means for communicating, via the optical wireless communication link after adjusting the optical communication component, a second optical wireless signal using the adjusted optical communication component.

Additionally, or alternatively, the communications manager 1320 may support optical wireless communications at a UE in accordance with examples as disclosed herein. For example, the communications manager 1320 is capable of, configured to, or operable to support a means for communicating, with a network entity via an optical wireless communication link, a first optical wireless signal using an optical communication system including a set of multiple lenses and a set of multiple optical communication components that are each optically coupled with a respective lens of the set of multiple lenses. The communications manager 1320 is capable of, configured to, or operable to support a means for adjusting the set of multiple optical communication components from a respective first position on a respective curved focal plane associated with the respective lens to a respective second position on the respective curved focal plane in accordance with a measurement of the first optical wireless signal. The communications manager 1320 is capable of, configured to, or operable to support a means for communicating, via the optical wireless communication link after adjusting the set of multiple optical communication components, a second optical wireless signal using the adjusted set of multiple optical communication components.

By including or configuring the communications manager 1320 in accordance with examples as described herein, the device 1305 may support techniques for utilizing curved focal planes and/or an optical communication system for optical wireless communication, which may allow for higher spectrum efficiency, improved beam management, improved communication reliability, higher data rates, reduced latency, improved user experience related to reduced processing, increased coordination between communication devices, reduced power consumption, and longer battery life, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of utilizing curved focal planes for optical wireless communication as described herein, or the at least one processor 1340 and the at least one memory 1330 may be otherwise configured to, individually or collectively, perform or support such operations.

Figure 14:
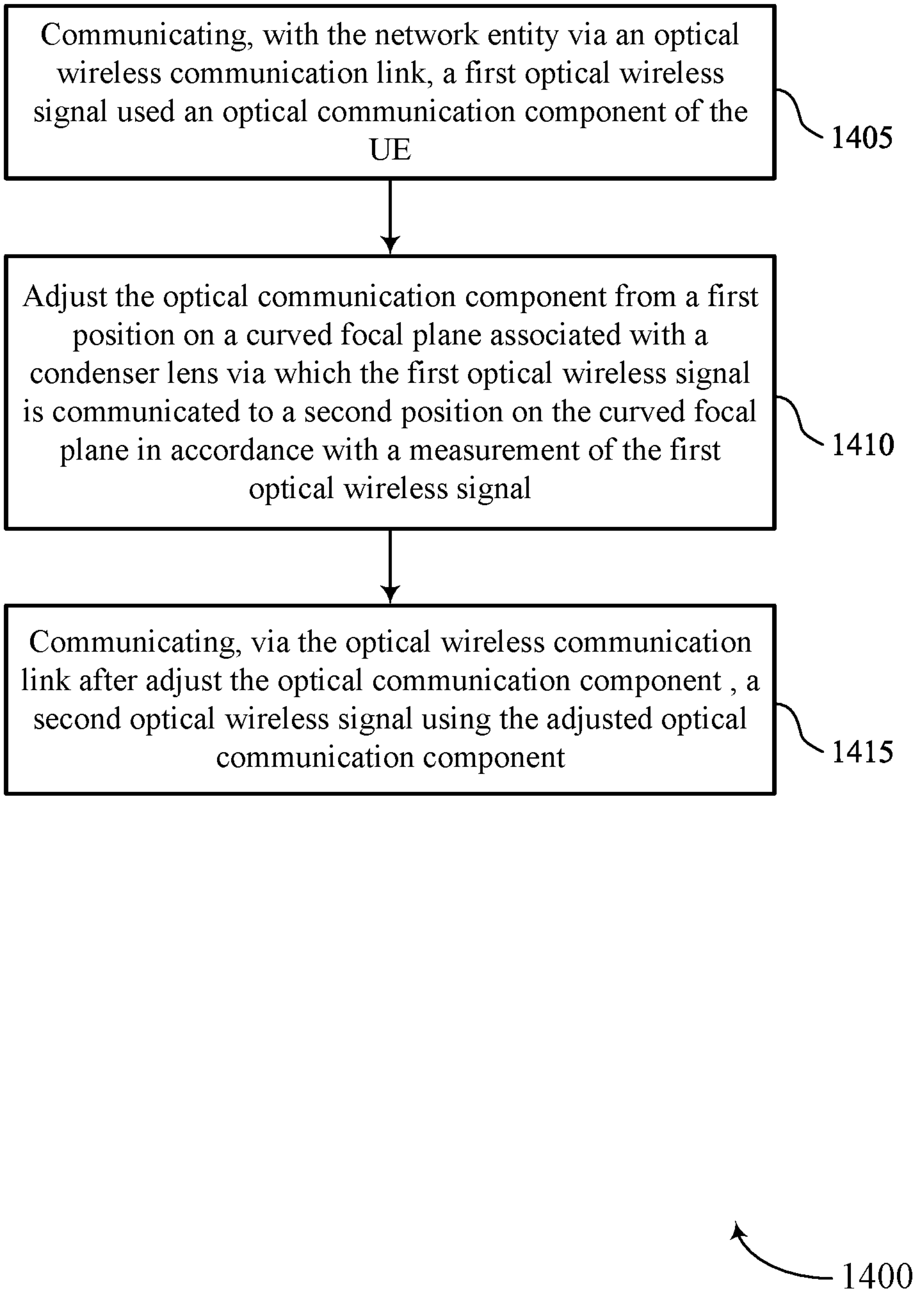
FIGS. 14-19 show flowcharts illustrating methods that support utilizing curved focal planes for optical wireless communication in accordance with one or more aspects of the present disclosure.

FIG. 14 shows a flowchart illustrating a method 1400 that supports utilizing curved focal planes for optical wireless communication in accordance with aspects of the present disclosure. The operations of the method 1400 may be implemented by a UE or its components as described herein. For example, the operations of the method 1400 may be performed by a UE 115 as described with reference to FIGS. 1-13. In some examples, a UE may execute a set of instructions to control the functional elements of the UE to perform the described functions. Additionally, or alternatively, the UE may perform aspects of the described functions using special-purpose hardware.

At 1405, the method may include communicating, with the network entity via an optical wireless communication link, a first optical wireless signal using an optical communication component of the UE. The operations of block 1405 may be performed in accordance with examples as disclosed herein. In some examples, aspects of the operations of 1405 may be performed by an optical wireless signal communication manager 1225 as described with reference to FIG. 12.

At 1410, the method may include adjusting the optical communication component from a first position on a curved focal plane associated with a condenser lens via which the first optical wireless signal is communicated to a second position on the curved focal plane in accordance with a measurement of the first optical wireless signal. The operations of block 1410 may be performed in accordance with examples as disclosed herein. In some examples, aspects of the operations of 1410 may be performed by an optical communication component position manager 1230 as described with reference to FIG. 12.

At 1415, the method may include communicating, via the optical wireless communication link after adjusting the optical communication component, a second optical wireless signal using the adjusted optical communication component. The operations of block 1415 may be performed in accordance with examples as disclosed herein. In some examples, aspects of the operations of 1415 may be performed by an optical wireless signal communication manager 1225 as described with reference to FIG. 12.

Figure 15:
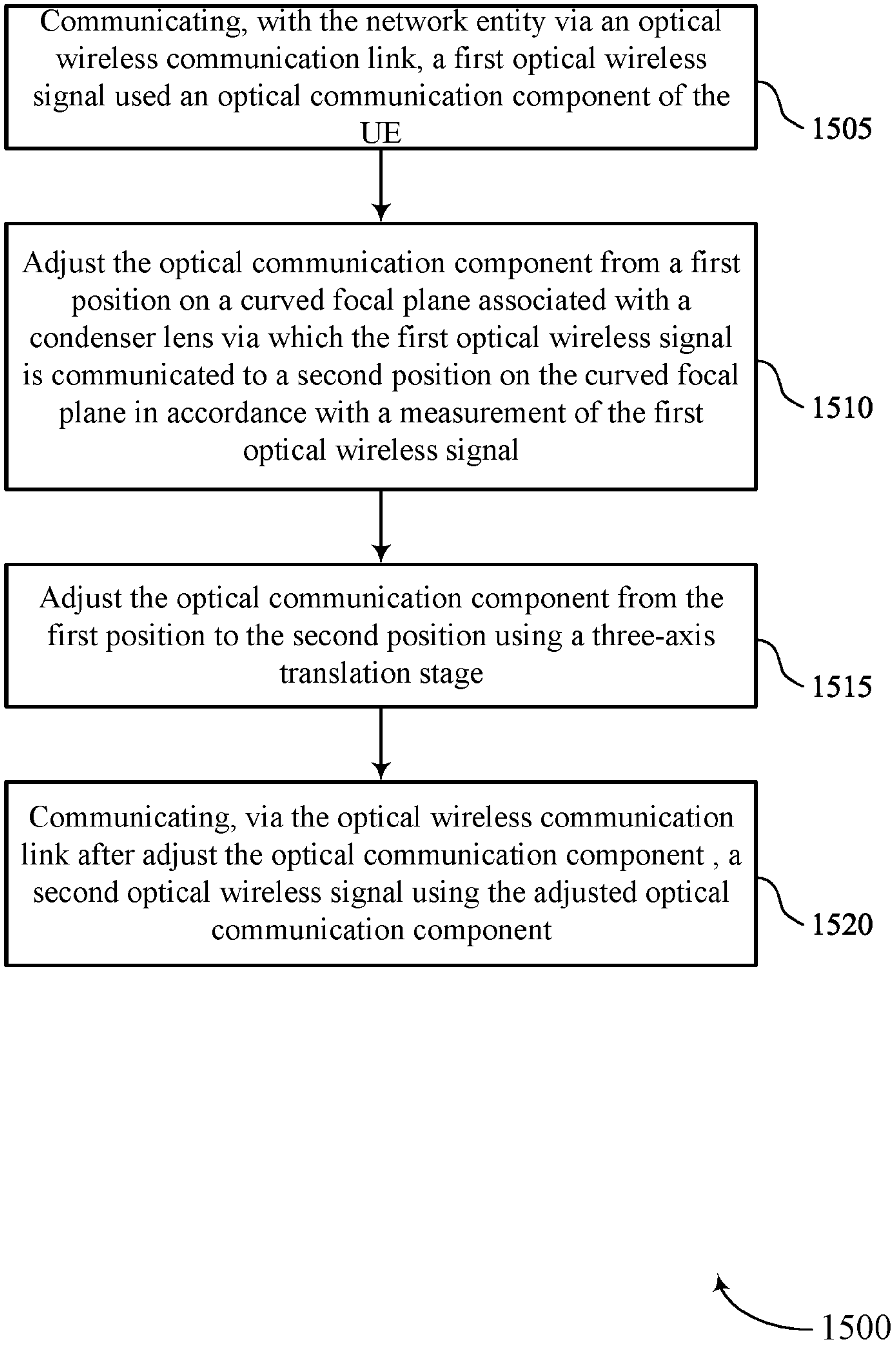

FIG. 15 shows a flowchart illustrating a method 1500 that supports utilizing curved focal planes for optical wireless communication in accordance with aspects of the present disclosure. The operations of the method 1500 may be implemented by a UE or its components as described herein. For example, the operations of the method 1500 may be performed by a UE 115 as described with reference to FIGS. 1-13. In some examples, a UE may execute a set of instructions to control the functional elements of the UE to perform the described functions. Additionally, or alternatively, the UE may perform aspects of the described functions using special-purpose hardware.

At 1505, the method may include communicating, with the network entity via an optical wireless communication link, a first optical wireless signal using an optical communication component of the UE. The operations of block 1505 may be performed in accordance with examples as disclosed herein. In some examples, aspects of the operations of 1505 may be performed by an optical wireless signal communication manager 1225 as described with reference to FIG. 12.

At 1510, the method may include adjusting the optical communication component from a first position on a curved focal plane associated with a condenser lens via which the first optical wireless signal is communicated to a second position on the curved focal plane in accordance with a measurement of the first optical wireless signal. The operations of block 1510 may be performed in accordance with examples as disclosed herein. In some examples, aspects of the operations of 1510 may be performed by an optical communication component position manager 1230 as described with reference to FIG. 12.

At 1515, to support adjusting the optical communication component, the method may include adjusting the optical communication component from the first position to the second position using a three-axis translation stage. The operations of block 1515 may be performed in accordance with examples as disclosed herein. In some examples, aspects of the operations of 1515 may be performed by an optical wireless signal communication manager 1225 as described with reference to FIG. 12.

At 1520, the method may include communicating, via the optical wireless communication link after adjusting the optical communication component, a second optical wireless signal using the adjusted optical communication component. The operations of block 1520 may be performed in accordance with examples as disclosed herein. In some examples, aspects of the operations of 1520 may be performed by an optical wireless signal communication manager 1225 as described with reference to FIG. 12.

Figure 16:
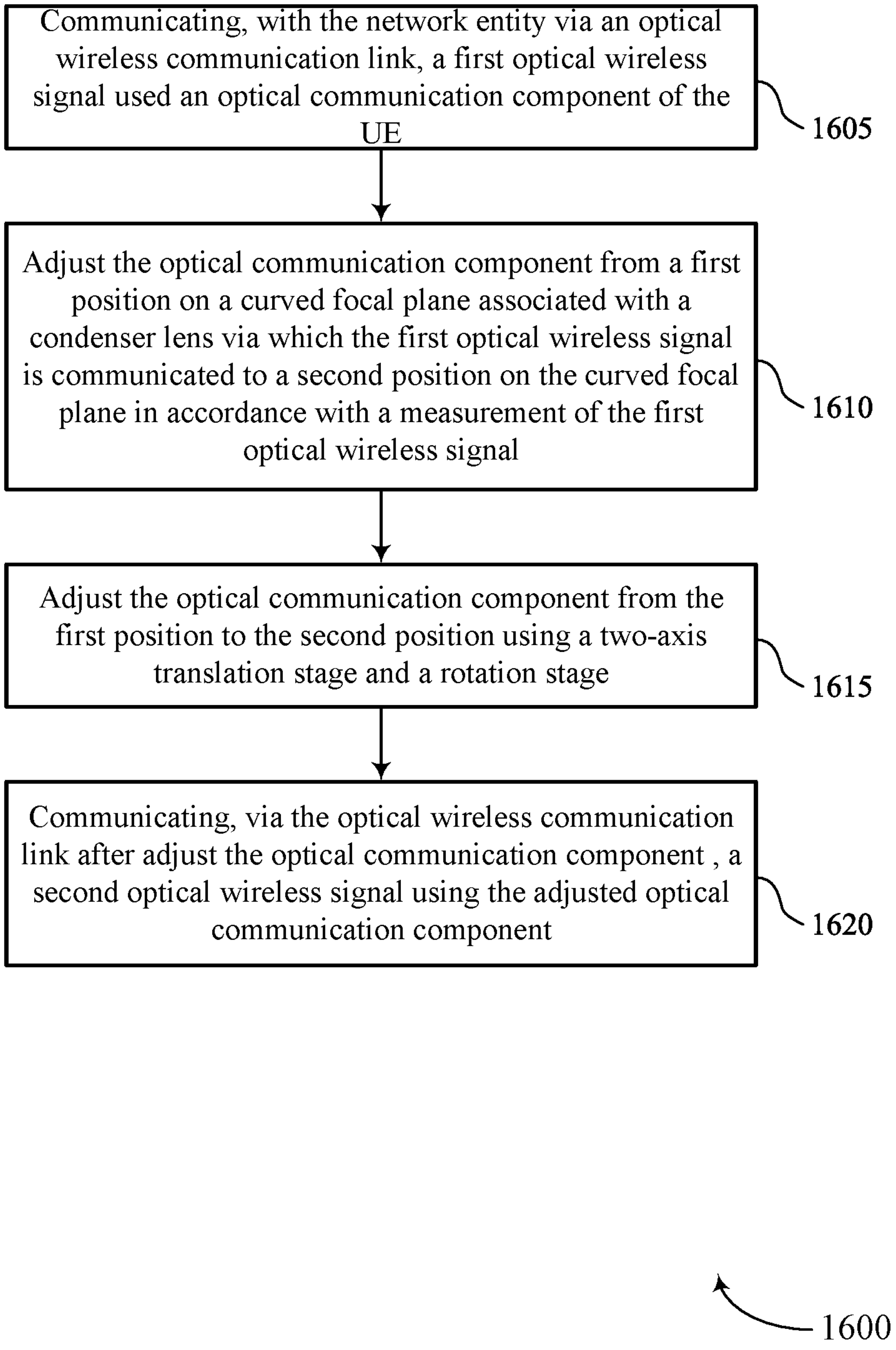

FIG. 16 shows a flowchart illustrating a method 1600 that supports utilizing curved focal planes for optical wireless communication in accordance with aspects of the present disclosure. The operations of the method 1600 may be implemented by a UE or its components as described herein. For example, the operations of the method 1600 may be performed by a UE 115 as described with reference to FIGS. 1-13. In some examples, a UE may execute a set of instructions to control the functional elements of the UE to perform the described functions. Additionally, or alternatively, the UE may perform aspects of the described functions using special-purpose hardware.

At 1605, the method may include communicating, with the network entity via an optical wireless communication link, a first optical wireless signal using an optical communication component of the UE. The operations of block 1605 may be performed in accordance with examples as disclosed herein. In some examples, aspects of the operations of 1605 may be performed by an optical wireless signal communication manager 1225 as described with reference to FIG. 12.

At 1610, the method may include adjusting the optical communication component from a first position on a curved focal plane associated with a condenser lens via which the first optical wireless signal is communicated to a second position on the curved focal plane in accordance with a measurement of the first optical wireless signal. The operations of block 1610 may be performed in accordance with examples as disclosed herein. In some examples, aspects of the operations of 1610 may be performed by an optical communication component position manager 1230 as described with reference to FIG. 12.

At 1615, to support adjusting the optical communication component, the method may include adjusting the optical communication component from the first position to the second position using a two-axis translation stage and a rotation stage. The operations of block 1615 may be performed in accordance with examples as disclosed herein. In some examples, aspects of the operations of 1615 may be performed by an optical communication component position manager 1230 as described with reference to FIG. 12.

At 1620, the method may include communicating, via the optical wireless communication link after adjusting the optical communication component, a second optical wireless signal using the adjusted optical communication component. The operations of block 1620 may be performed in accordance with examples as disclosed herein. In some examples, aspects of the operations of 1620 may be performed by an optical wireless signal communication manager 1225 as described with reference to FIG. 12.

Figure 17:
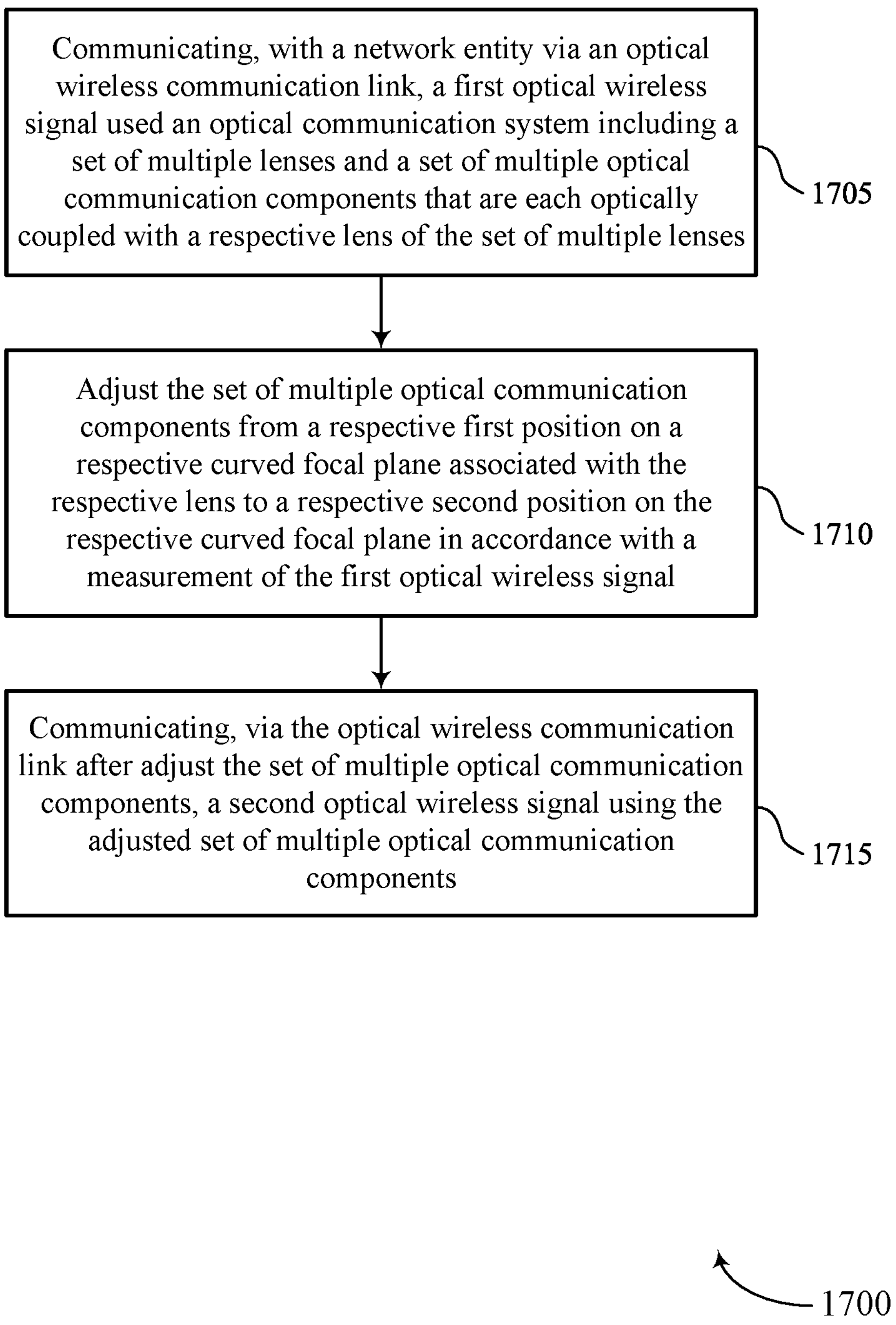

FIG. 17 shows a flowchart illustrating a method 1700 that supports utilizing curved focal planes for optical wireless communication in accordance with aspects of the present disclosure. The operations of the method 1700 may be implemented by a UE or its components as described herein. For example, the operations of the method 1700 may be performed by a UE 115 as described with reference to FIGS. 1-13. In some examples, a UE may execute a set of instructions to control the functional elements of the UE to perform the described functions. Additionally, or alternatively, the UE may perform aspects of the described functions using special-purpose hardware.

At 1705, the method may include communicating, with a network entity via an optical wireless communication link, a first optical wireless signal using an optical communication system including a set of multiple lenses and a set of multiple optical communication components that are each optically coupled with a respective lens of the set of multiple lenses. The operations of block 1705 may be performed in accordance with examples as disclosed herein. In some examples, aspects of the operations of 1705 may be performed by an optical wireless signal communication manager 1225 as described with reference to FIG. 12.

At 1710, the method may include adjusting the set of multiple optical communication components from a respective first position on a respective curved focal plane associated with the respective lens to a respective second position on the respective curved focal plane in accordance with a measurement of the first optical wireless signal. The operations of block 1710 may be performed in accordance with examples as disclosed herein. In some examples, aspects of the operations of 1710 may be performed by an optical communication component position manager 1230 as described with reference to FIG. 12.

At 1715, the method may include communicating, via the optical wireless communication link after adjusting the set of multiple optical communication components, a second optical wireless signal using the adjusted set of multiple optical communication components. The operations of block 1715 may be performed in accordance with examples as disclosed herein. In some examples, aspects of the operations of 1715 may be performed by an optical wireless signal communication manager 1225 as described with reference to FIG. 12.

Figure 18:
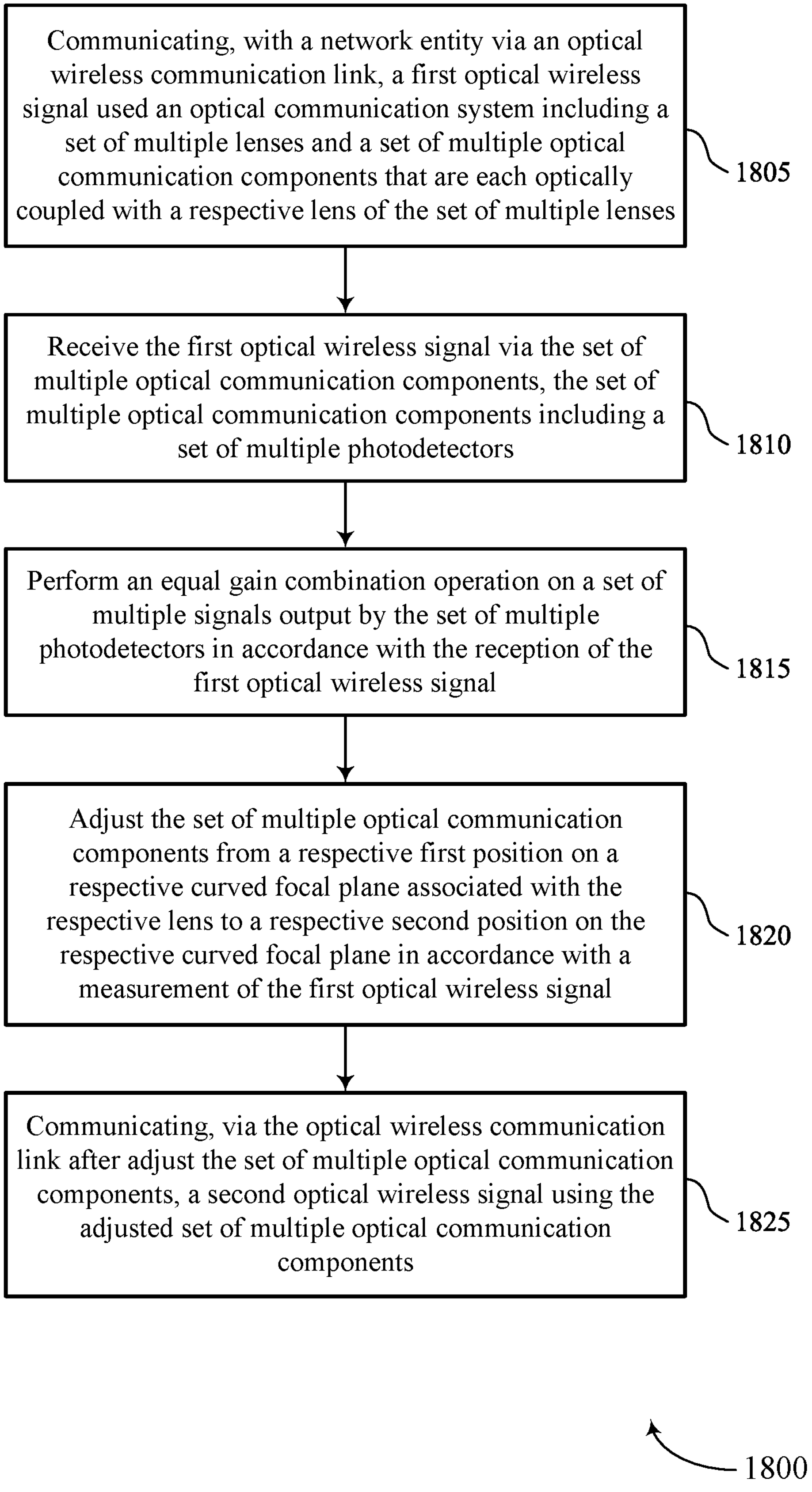

FIG. 18 shows a flowchart illustrating a method 1800 that supports utilizing curved focal planes for optical wireless communication in accordance with aspects of the present disclosure. The operations of the method 1800 may be implemented by a UE or its components as described herein. For example, the operations of the method 1800 may be performed by a UE 115 as described with reference to FIGS. 1-13. In some examples, a UE may execute a set of instructions to control the functional elements of the UE to perform the described functions. Additionally, or alternatively, the UE may perform aspects of the described functions using special-purpose hardware.

At 1805, the method may include communicating, with a network entity via an optical wireless communication link, a first optical wireless signal using an optical communication system including a set of multiple lenses and a set of multiple optical communication components that are each optically coupled with a respective lens of the set of multiple lenses. The operations of block 1805 may be performed in accordance with examples as disclosed herein. In some examples, aspects of the operations of 1805 may be performed by an optical wireless signal communication manager 1225 as described with reference to FIG. 12.

At 1810, to support communicating the first optical wireless signal, the method may include receiving the first optical wireless signal via the set of multiple optical communication components, the set of multiple optical communication components including a set of multiple photodetectors. The operations of block 1810 may be performed in accordance with examples as disclosed herein. In some examples, aspects of the operations of 1810 may be performed by an optical wireless signal communication manager 1225 as described with reference to FIG. 12.

At 1815, to support communicating the first optical wireless signal, the method may include performing an equal gain combination operation on a set of multiple signals output by the set of multiple photodetectors in accordance with the reception of the first optical wireless signal. The operations of block 1815 may be performed in accordance with examples as disclosed herein. In some examples, aspects of the operations of 1815 may be performed by an equal gain combination manager 1240 as described with reference to FIG. 12.

At 1820, the method may include adjusting the set of multiple optical communication components from a respective first position on a respective curved focal plane associated with the respective lens to a respective second position on the respective curved focal plane in accordance with a measurement of the first optical wireless signal. The operations of block 1820 may be performed in accordance with examples as disclosed herein. In some examples, aspects of the operations of 1820 may be performed by an optical communication component position manager 1230 as described with reference to FIG. 12.

At 1825, the method may include communicating, via the optical wireless communication link after adjusting the set of multiple optical communication components, a second optical wireless signal using the adjusted set of multiple optical communication components. The operations of block 1825 may be performed in accordance with examples as disclosed herein. In some examples, aspects of the operations of 1825 may be performed by an optical wireless signal communication manager 1225 as described with reference to FIG. 12.

Figure 19:
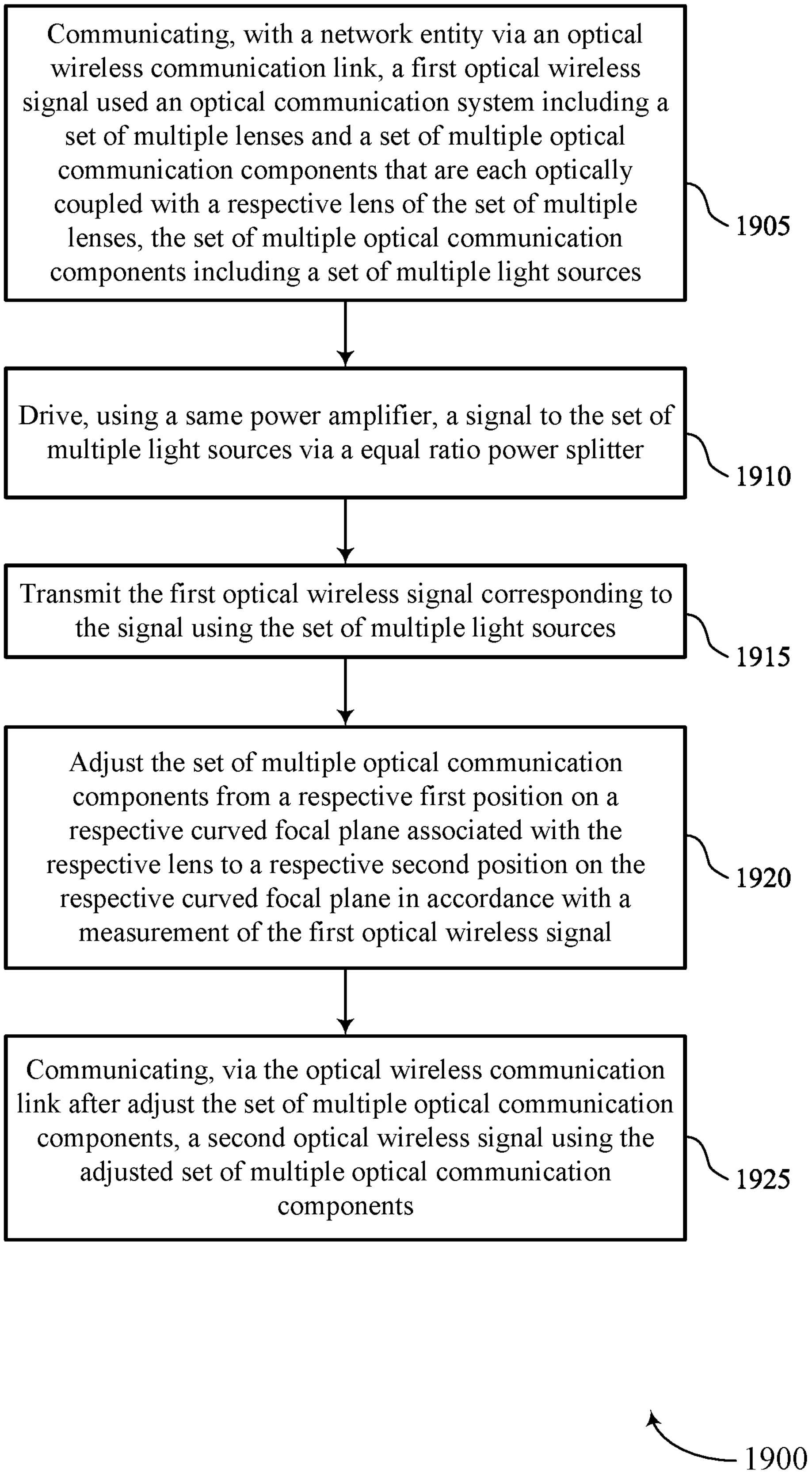

FIG. 19 shows a flowchart illustrating a method 1900 that supports utilizing curved focal planes for optical wireless communication in accordance with aspects of the present disclosure. The operations of the method 1900 may be implemented by a UE or its components as described herein. For example, the operations of the method 1900 may be performed by a UE 115 as described with reference to FIGS. 1-13. In some examples, a UE may execute a set of instructions to control the functional elements of the UE to perform the described functions. Additionally, or alternatively, the UE may perform aspects of the described functions using special-purpose hardware.

At 1905, the method may include communicating, with a network entity via an optical wireless communication link, a first optical wireless signal using an optical communication system including a set of multiple lenses and a set of multiple optical communication components that are each optically coupled with a respective lens of the set of multiple lenses, the set of multiple optical communication components including a set of multiple light sources. The operations of block 1905 may be performed in accordance with examples as disclosed herein. In some examples, aspects of the operations of 1905 may be performed by an optical wireless signal communication manager 1225 as described with reference to FIG. 12.

At 1910, to support communicating the first optical wireless signal, the method may include driving, using a same power amplifier, a signal to the set of multiple light sources via an equal-ratio power splitter. The operations of block 1910 may be performed in accordance with examples as disclosed herein. In some examples, aspects of the operations of 1910 may be performed by an equal-ratio power splitting manager 1245 as described with reference to FIG. 12.

At 1915, to support communicating the first optical wireless signal, the method may include transmitting the first optical wireless signal corresponding to the signal using the set of multiple light sources. The operations of block 1915 may be performed in accordance with examples as disclosed herein. In some examples, aspects of the operations of 1915 may be performed by an optical wireless signal communication manager 1225 as described with reference to FIG. 12.

At 1920, the method may include adjusting the set of multiple optical communication components from a respective first position on a respective curved focal plane associated with the respective lens to a respective second position on the respective curved focal plane in accordance with a measurement of the first optical wireless signal. The operations of block 1920 may be performed in accordance with examples as disclosed herein. In some examples, aspects of the operations of 1920 may be performed by an optical communication component position manager 1230 as described with reference to FIG. 12.

At 1925, the method may include communicating, via the optical wireless communication link after adjusting the set of multiple optical communication components, a second optical wireless signal using the adjusted set of multiple optical communication components. The operations of block 1925 may be performed in accordance with examples as disclosed herein. In some examples, aspects of the operations of 1925 may be performed by an optical wireless signal communication manager 1225 as described with reference to FIG. 12.

The following provides an overview of aspects of the present disclosure:

Aspect 1: An apparatus for optical wireless communication at a UE, comprising: a condenser lens; a set of optical communication components positioned on a curved focal plane associated with the condenser lens, the set of optical communication components comprising: one or more first optical communication components positioned on the curved focal plane a first distance from the condenser lens; and one or more second optical communication components positioned on the curved focal plane a second distance different than the first distance from the condenser lens; one or more memories storing processor-executable code; and one or more processors coupled with the one or more memories and individually or collectively configured to, when executing the code, cause the apparatus to: establish an optical wireless communication link with a network entity; and communicate, with the network entity via the optical wireless communication link, an optical wireless signal using at least one of the set of optical communication components.

Aspect 2: The apparatus of aspect 1, further comprising: one or more stages coupled with the set of optical communication components, where the one or more processors are individually or collectively further configured to, when executing the code, cause the apparatus to: adjust, using the one or more stages, one or more of the one or more first optical communication components, one or more of the one or more second optical communication components, or both, from respective first positions on the curved focal plane to respective second positions on the curved focal plane in accordance with a measurement of the optical wireless signal.

Aspect 3: The apparatus of aspect 2, where the one or more of the one or more first optical communication components, the one or more of the one or more second optical communication components, or both, are adjusted in accordance with the measurement of the optical wireless signal failing to satisfy a threshold, the measurement comprising an SNR, an SINR, an RSRP, or a combination thereof.

Aspect 4: The apparatus of any of aspects 2 through 3, where the one or more stages include a three-axis translation stage, a two-axis translation stage, a rotation stage, or a combination thereof.

Aspect 5: The apparatus of any of aspects 1 through 4, further comprising: one or more stages coupled with the condenser lens, where the one or more processors are individually or collectively further configured to, when executing the code, cause the apparatus to: adjust, using the one or more stages in accordance with a measurement of the optical wireless signal, the condenser lens from a first position to a second position to adjust the one or more first optical communication components and the one or more second optical communication components from respective third positions on the curved focal plane to respective second positions on the curved focal plane.

Aspect 6: The apparatus of any of aspects 1 through 5, where: the one or more first optical communication components include one or more first photodetectors, one or more first light sources or both, and the one or more second optical communication components include one or more second photodetectors, one or more second light sources, or both.

Aspect 7: The apparatus of any of aspects 1 through 6, where the one or more first optical communication components and the one or more second optical communication components are positioned on the curved focal plane in accordance with a field of view associated with the UE.

Aspect 8: A method for optical wireless communication at a UE, comprising: communicating, with a network entity via an optical wireless communication link, a first optical wireless signal using an optical communication component of the UE; adjusting the optical communication component from a first position on a curved focal plane associated with a condenser lens via which the first optical wireless signal is communicated to a second position on the curved focal plane in accordance with a measurement of the first optical wireless signal; and communicating, via the optical wireless communication link after adjusting the optical communication component, a second optical wireless signal using the adjusted optical communication component.

Aspect 9: The method of aspect 8, wherein a second measurement of the second optical wireless signal is greater than the measurement of the first optical wireless signal in accordance with the adjustment of the optical communication component.

Aspect 10: The method of any of aspects 8 through 9, wherein adjusting the optical communication component comprises adjusting the optical communication component from the first position to the second position using a three-axis translation stage.

Aspect 11: The method of any of aspects 8 through 9, wherein adjusting the optical communication component comprises adjusting the optical communication component from the first position to the second position using a two-axis translation stage and a rotation stage.

Aspect 12: The method of any of aspects 8 through 11, wherein adjusting the optical communication component comprises adjusting the optical communication component from the first position to the second position in accordance with the measurement of the first optical wireless signal failing to satisfy a threshold.

Aspect 13: The method of any of aspects 8 through 12, wherein adjusting the optical communication component from the first position to the second position comprises adjusting the condenser lens from a third position to a fourth position to adjust a relative position of the optical communication component on the curved focal plane from the first position to the second position.

Aspect 14: The method of any of aspects 8 through 13, wherein communicating the first optical wireless signal comprises receiving the first optical wireless signal using the optical communication component, the optical communication component comprising a photodetector.

Aspect 15: The method of any of aspects 8 through 13, wherein communicating the first optical wireless signal comprises transmitting the first optical wireless signal using the optical communication component, the optical communication component comprising a light source.

Aspect 16: The method of any of aspects 8 through 15, wherein the measurement of the first optical wireless signal comprises an SNR, an SINR, an RSRP, or a combination thereof.

Aspect 17: An apparatus for optical wireless communication at a UE, comprising: an optical communication system comprising: a plurality of lenses; and a plurality of optical communication components that are each optically coupled with a respective lens of the plurality of lenses and positioned on a respective curved focal plane associated with the respective lens; one or more memories storing processor-executable code; and one or more processors coupled with the one or more memories and individually or collectively configured to, when executing the code, cause the apparatus to: establish an optical wireless communication link with a network entity; and communicate, with the network entity via the optical wireless communication link, an optical wireless signal using the optical communication system.

Aspect 18: The apparatus of aspect 17, where, to communicate the optical wireless signal, the one or more processors are individually or collectively configured to, when executing the code, cause the apparatus to: receive the optical wireless signal via the plurality of optical communication components, the plurality of optical communication components comprising a plurality of photodetectors; and perform an equal gain combination operation on a plurality of signals output by the plurality of photodetectors in accordance with the reception of the optical wireless signal.

Aspect 19: The apparatus of aspect 17, further comprising: a power amplifier; and an equal-ratio power splitter, where the plurality of optical communication components includes a plurality of light sources, and where, to communicate the optical wireless signal, the one or more processors are individually or collectively configured to, when executing the code, cause the apparatus to: drive, using the power amplifier, a signal to the plurality of light sources via the equal-ratio power splitter; and transmit the optical wireless signal corresponding to the signal using the plurality of light sources.

Aspect 20: The apparatus of any of aspects 17 through 19, where the plurality of optical communication components includes a plurality of photodetectors, the apparatus further comprising: a second optical communication system comprising: a plurality of second lenses; and a plurality of light sources that are each optically coupled with a respective second lens of the plurality of second lenses and positioned on a respective curved focal plane associated with the respective second lens, where the one or more processors are individually or collectively further configured to, when executing the code, cause the apparatus to: transmit, to the network entity via the optical wireless communication link, a second optical wireless signal using the second optical communication system.

Aspect 21: The apparatus of aspect 20, further comprising: one or more first stages coupled with the plurality of photodetectors; and one or more second stages coupled with the plurality of light sources, where the optical communication system and the second optical communication system are associated with a same field of view of the UE in accordance with respective position adjustment of the plurality of photodetectors and the plurality of light sources supported by the one or more first stages and the one or more second stages.

Aspect 22: The apparatus of any of aspects 17 through 21, where the optical communication system further includes a plurality of second optical communication components that are each positioned adjacent to a respective optical communication component of the plurality of optical communication components, each second optical communication component optically coupled with the respective lens of the plurality of lenses and positioned on the respective curved focal plane associated with the respective lens.

Aspect 23: The apparatus of any of aspects 17 through 22, further comprising: one or more stages coupled with the plurality of optical communication components, where the one or more processors are individually or collectively further configured to, when executing the code, cause the apparatus to: adjust, using the one or more stages, the plurality of optical communication components from a respective first position on a respective curved focal plane to a respective second position on the respective curved focal plane in accordance with a measurement of the optical wireless signal.

Aspect 24: The apparatus of aspect 23, where to adjust the plurality of optical communication components, the one or more processors are individually or collectively configured to, when executing the code, cause the apparatus to adjust the plurality of optical communication components from the respective first position to the respective second position in accordance with the measurement of the optical wireless signal failing to satisfy a threshold.

Aspect 25: The apparatus of any of aspects 17 through 24, further comprising: one or more stages coupled with the plurality of lenses, where the one or more processors are individually or collectively further configured to, when executing the code, cause the apparatus to: adjust, using the one or more stages in accordance with a measurement of the optical wireless signal, the plurality of lenses from a respective first position to a respective second position to adjust the plurality of optical communication components from a respective third position on the respective curved focal plane to a respective fourth position on the respective curved focal plane.

Aspect 26: A method for optical wireless communication at a UE, comprising: communicating, with a network entity via an optical wireless communication link, a first optical wireless signal using an optical communication system comprising a plurality of lenses and a plurality of optical communication components that are each optically coupled with a respective lens of the plurality of lenses; adjusting the plurality of optical communication components from a respective first position on a respective curved focal plane associated with the respective lens to a respective second position on the respective curved focal plane in accordance with a measurement of the first optical wireless signal; and communicating, via the optical wireless communication link after adjusting the plurality of optical communication components, a second optical wireless signal using the adjusted plurality of optical communication components.

Aspect 27: The method of aspect 26, wherein communicating first optical wireless signal comprises: receiving the first optical wireless signal via the plurality of optical communication components, the plurality of optical communication components comprising a plurality of photodetectors; and performing an equal gain combination operation on a plurality of signals output by the plurality of photodetectors in accordance with the reception of the first optical wireless signal.

Aspect 28: The method of aspect 26, wherein the plurality of optical communication components comprises a plurality of light sources, wherein communicating the first optical wireless signal comprises: driving, using a same power amplifier, a signal to the plurality of light sources via an equal-ratio power splitter; and transmitting the first optical wireless signal corresponding to the signal using the plurality of light sources.

Aspect 29: The method of any of aspects 26 through 28, wherein adjusting the plurality of optical communication components comprises adjusting the plurality of optical communication components from the respective first position to the respective second position using one or more three-axis translation stages or one or more two-axis translation stages and one or more rotation stages.

Aspect 30: The method of any of aspects 26 through 29, wherein adjusting the plurality of optical communication components comprises adjusting the plurality of optical communication components from the respective first position to the respective second position in accordance with the measurement of the first optical wireless signal failing to satisfy a threshold.

Aspect 31: An apparatus for optical wireless communication at a UE, comprising one or more memories storing processor-executable code; and one or more processors coupled with the one or more memories and individually or collectively configured to, when executing the code, cause the apparatus to perform a method of any of aspects 8 through 16.

Aspect 32: An apparatus for optical wireless communication at a UE, comprising at least one means for performing a method of any of aspects 8 through 16.

Aspect 33: A non-transitory computer-readable medium storing code for optical wireless communication at a UE, the code comprising instructions executable by at least one processor to perform a method of any of aspects 8 through 16.

Aspect 34: An apparatus for optical wireless communication at a UE, comprising one or more memories storing processor-executable code; and one or more processors coupled with the one or more memories and individually or collectively configured to, when executing the code, cause the apparatus to perform a method of any of aspects 26 through 30.

Aspect 35: An apparatus for optical wireless communication at a UE, comprising at least one means for performing a method of any of aspects 26 through 30.

Aspect 36: A non-transitory computer-readable medium storing code for optical wireless communication at a UE, the code comprising instructions executable by at least one processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for optical wireless communication at a user equipment (UE), comprising:

a condenser lens;

a set of optical communication components positioned on a curved focal plane associated with the condenser lens, the set of optical communication components comprising:

one or more first optical communication components positioned on the curved focal plane a first distance from the condenser lens; and one or more second optical communication components positioned on the curved focal plane a second distance different than the first distance from the condenser lens;

one or more memories storing processor-executable code; and one or more processors coupled with the one or more memories and individually or collectively configured to, when executing the code, cause the apparatus to:

establish an optical wireless communication link with a network entity; and communicate, with the network entity via the optical wireless communication link, an optical wireless signal using at least one of the one or more first optical communication components or the one or more second optical communication components.

2. The apparatus of claim 1, further comprising one or more stages coupled with the set of optical communication components, wherein the one or more processors are individually or collectively further configured to, when executing the code, cause the apparatus to:

adjust, using the one or more stages, one or more of the one or more first optical communication components, one or more of the one or more second optical communication components, or both, from respective first positions on the curved focal plane to respective second positions on the curved focal plane in accordance with a measurement of the optical wireless signal.

3. The apparatus of claim 2, wherein the one or more of the one or more first optical communication components, the one or more of the one or more second optical communication components, or both, are adjusted in accordance with the measurement of the optical wireless signal failing to satisfy a threshold, the measurement comprising a signal-to-noise ratio, a signal-to-interference-plus-noise ratio, a reference signal received power, or a combination thereof.

4. The apparatus of claim 2, wherein the one or more stages comprise a three-axis translation stage, a two-axis translation stage, a rotation stage, or a combination thereof.

5. The apparatus of claim 1, further comprising one or more stages coupled with the condenser lens, wherein the one or more processors are individually or collectively further configured to, when executing the code, cause the apparatus to:

adjust, using the one or more stages in accordance with a measurement of the optical wireless signal, the condenser lens from a first position to a second position to adjust the one or more first optical communication components and the one or more second optical communication components from respective third positions on the curved focal plane to respective fourth positions on the curved focal plane.

6. The apparatus of claim 1, wherein:

the one or more first optical communication components comprise one or more first photodetectors, one or more first light sources or both, and the one or more second optical communication components comprise one or more second photodetectors, one or more second light sources, or both.

7. The apparatus of claim 1, wherein the one or more first optical communication components and the one or more second optical communication components are positioned on the curved focal plane in accordance with a field of view associated with the UE.

8. A method for optical wireless communication at a user equipment (UE), comprising:

communicating, with a network entity via an optical wireless communication link, a first optical wireless signal using an optical communication component of the UE;

adjusting the optical communication component from a first position on a curved focal plane associated with a condenser lens via which the first optical wireless signal is communicated to a second position on the curved focal plane in accordance with a measurement of the first optical wireless signal; and communicating, via the optical wireless communication link after adjusting the optical communication component, a second optical wireless signal using the adjusted optical communication component.

9. The method of claim 8, wherein a second measurement of the second optical wireless signal is greater than the measurement of the first optical wireless signal in accordance with the adjustment of the optical communication component.

10. The method of claim 8, wherein adjusting the optical communication component comprises adjusting the optical communication component from the first position to the second position using a three-axis translation stage.

11. The method of claim 8, wherein adjusting the optical communication component comprises adjusting the optical communication component from the first position to the second position using a two-axis translation stage and a rotation stage.

12. The method of claim 8, wherein adjusting the optical communication component comprises adjusting the optical communication component from the first position to the second position in accordance with the measurement of the first optical wireless signal failing to satisfy a threshold.

13. The method of claim 8, wherein adjusting the optical communication component from the first position to the second position comprises adjusting the condenser lens from a third position to a fourth position to adjust a relative position of the optical communication component on the curved focal plane from the first position to the second position.

14. The method of claim 8, wherein communicating the first optical wireless signal comprises receiving the first optical wireless signal using the optical communication component, the optical communication component comprising a photodetector.

15. The method of claim 8, wherein communicating the first optical wireless signal comprises transmitting the first optical wireless signal using the optical communication component, the optical communication component comprising a light source.

16. The method of claim 8, wherein the measurement of the first optical wireless signal comprises a signal-to-noise ratio, a signal-to-interference-plus-noise ratio, a reference signal received power, or a combination thereof.

17. An apparatus for optical wireless communication at a user equipment (UE), comprising:
- an optical communication system comprising:
  - a plurality of condenser lenses;
  - a plurality of light sources, each light source being optically coupled with a respective condenser lens of the plurality of condenser lenses and positioned on a respective curved focal plane associated with the respective condenser lens; and
  - a plurality of photodetectors, each photodetector being positioned adjacent to a respective light source of the plurality of light sources, each photodetector being optically coupled with the same respective condenser lens associated with the respective light source and positioned on the respective curved focal plane associated with the respective condenser lens;
- one or more memories storing processor-executable code; and
- one or more processors coupled with the one or more memories and individually or collectively configured to, when executing the code, cause the apparatus to:
  - establish an optical wireless communication link with a network entity; and
  - communicate, with the network entity via the optical wireless communication link, an optical wireless signal using the optical communication system.

18. The apparatus of claim 17, wherein, to communicate the optical wireless signal, the one or more processors are individually or collectively configured to, when executing the code, cause the apparatus to:
- receive the optical wireless signal via the plurality of photodetectors; and
- perform an equal gain combination operation on a plurality of signals output by the plurality of photodetectors in accordance with the reception of the optical wireless signal.

19. The apparatus of claim 17, further comprising:
- a power amplifier; and
- an equal-ratio power splitter, and wherein, to communicate the optical wireless signal, the one or more processors are individually or collectively configured to, when executing the code, cause the apparatus to:
  - drive, using the power amplifier, a signal to the plurality of light sources via the equal-ratio power splitter; and
  - transmit the optical wireless signal corresponding to the signal using the plurality of light sources.

20. The apparatus of claim 17, further comprising:
- one or more first stages coupled with the plurality of photodetectors; and
- one or more second stages coupled with the plurality of light sources,
- wherein the plurality of photodetectors and the plurality of light sources are associated with a same field of view of the UE in accordance with respective position adjustment of the plurality of photodetectors and the plurality of light sources supported by the one or more first stages and the one or more second stages.

21. The apparatus of claim 17, further comprising one or more stages coupled with the plurality of photodetectors, the plurality of light sources, or both, wherein the one or more processors are individually or collectively further configured to, when executing the code, cause the apparatus to:
- adjust, using the one or more stages, the plurality of photodetectors, the plurality of light sources, or both from a respective first position on a respective curved focal plane to a respective second position on the respective curved focal plane in accordance with a measurement of the optical wireless signal failing to satisfy a threshold.

22. The apparatus of claim 17, further comprising one or more stages coupled with the plurality of condenser lenses, wherein the one or more processors are individually or collectively further configured to, when executing the code, cause the apparatus to:
- adjust, using the one or more stages in accordance with a measurement of the optical wireless signal, the plurality of condenser lenses from a respective first position to a respective second position to adjust the plurality of photodetectors, the plurality of light sources, or both, from a respective third position on the respective curved focal plane to a respective fourth position on the respective curved focal plane.

23. A method for optical wireless communication at a user equipment (UE), comprising:
- communicating, with a network entity via an optical wireless communication link, a first optical wireless signal using an optical communication system comprising a plurality of lenses and a plurality of optical communication components that are each optically coupled with a respective lens of the plurality of lenses;
- adjusting the plurality of optical communication components from a respective first position on a respective curved focal plane associated with the respective lens to a respective second position on the respective curved focal plane in accordance with a measurement of the first optical wireless signal; and communicating, via the optical wireless communication link after adjusting the plurality of optical communication components, a second optical wireless signal using the adjusted plurality of optical communication components.

24. The method of claim 23, wherein communicating first optical wireless signal comprises:

receiving the first optical wireless signal via the plurality of optical communication components, the plurality of optical communication components comprising a plurality of photodetectors; and performing an equal gain combination operation on a plurality of signals output by the plurality of photodetectors in accordance with the reception of the first optical wireless signal.

25. The method of claim 23, wherein the plurality of optical communication components comprises a plurality of light sources, wherein communicating the first optical wireless signal comprises:

driving, using a same power amplifier, a signal to the plurality of light sources via an equal-ratio power splitter; and transmitting the first optical wireless signal corresponding to the signal using the plurality of light sources.

26. The method of claim 23, wherein adjusting the plurality of optical communication components comprises adjusting the plurality of optical communication components from the respective first position to the respective second position using one or more three-axis translation stages or one or more two-axis translation stages and one or more rotation stages.

27. The method of claim 23, wherein adjusting the plurality of optical communication components comprises adjusting the plurality of optical communication components from the respective first position to the respective second position in accordance with the measurement of the first optical wireless signal failing to satisfy a threshold.

* * * * *